(12) United States Patent
Margaria et al.

(10) Patent No.: US 11,290,348 B1
(45) Date of Patent: Mar. 29, 2022

(54) INTERACTIVE USER INTERFACES FOR DISPLAYING FEATURES OF AN OPTIMIZED NETWORK PLAN

(71) Applicant: Juniper Networks, Inc., Sunnyvale, CA (US)

(72) Inventors: Cyril Margaria, Mountain View, CA (US); Richard M. Chen, Metuchen, NJ (US)

(73) Assignee: Juniper Networks, Inc., Sunnyvale, CA (US)

(*) Notice: Subject to any disclaimer, the term of this patent is extended or adjusted under 35 U.S.C. 154(b) by 131 days.

(21) Appl. No.: 16/368,354

(22) Filed: Mar. 28, 2019

(51) Int. Cl.
*H04L 41/12* (2022.01)
*H04L 41/22* (2022.01)
*G06T 11/20* (2006.01)

(52) U.S. Cl.
CPC ............ *H04L 41/22* (2013.01); *G06T 11/206* (2013.01); *H04L 41/12* (2013.01)

(58) Field of Classification Search
None
See application file for complete search history.

(56) References Cited

U.S. PATENT DOCUMENTS

| | | | |
|---|---|---|---|
| 9,436,735 B1* | 9/2016 | Feng | G06F 16/24549 |
| 10,425,832 B1* | 9/2019 | Zawadzki | H04L 41/5038 |
| 2008/0181609 A1 | 7/2008 | Yi et al. | |
| 2013/0132854 A1* | 5/2013 | Raleigh | H04W 4/60 |
| | | | 715/738 |
| 2015/0304453 A1* | 10/2015 | Arteaga | H04L 47/824 |
| | | | 709/226 |
| 2016/0087849 A1* | 3/2016 | Balasubramanian | H04L 41/12 |
| | | | 709/221 |
| 2016/0350173 A1* | 12/2016 | Ahad | G06F 11/0751 |
| 2017/0111282 A1* | 4/2017 | Chen | H04L 47/125 |
| 2017/0373943 A1 | 12/2017 | Goel et al. | |
| 2019/0245805 A1* | 8/2019 | Sakic | H04L 41/12 |
| 2020/0021515 A1* | 1/2020 | Michael | H04L 45/121 |

OTHER PUBLICATIONS

Extended European search report for Application No. EP19219038.7, dated Jun. 26, 2020, 11 pages.

* cited by examiner

*Primary Examiner* — Xuyang Xia
(74) *Attorney, Agent, or Firm* — Harrity & Harrity, LLP

(57) ABSTRACT

A device receives network data associated with a network that includes network devices interconnected by links, and receives constraints. The device determines potential network plans for the network based on the constraints and the network data, and identifies a potential network plan that minimizes costs associated with operating the network. The device aggregates the network data for the potential network plan to generate first aggregated data, and generates a first user interface based on the first aggregated data. The device provides the first user interface to a client device, and receives, from the client device, information indicating a first interaction with the first user interface. The device aggregates the first aggregated data, based on the first interaction, to generate second aggregated data, and generates a second user interface based on the second aggregated data. The device provides the second user interface to the client device.

20 Claims, 19 Drawing Sheets

INTERACTIVE USER INTERFACES FOR DISPLAYING FEATURES OF AN OPTIMIZED NETWORK PLAN

BACKGROUND

Network planning and design is an iterative process, encompassing topological design, network-synthesis, and network-realization. Network planning and design is aimed at ensuring that a new or an existing network or service satisfies needs of network subscribers and/or network operators.

SUMMARY

According to some implementations, a method may include receiving network data associated with a network, wherein the network may include a plurality of network devices interconnected by links, and receiving constraints associated with determining a network plan for the network. The method may include determining a plurality of potential network plans for the network based on the constraints and the network data, and identifying a potential network plan, of the plurality of potential network plans, that minimizes costs associated with operating the network. The method may include aggregating the network data associated with the potential network plan to generate first aggregated data, and generating a first user interface associated with the potential network plan based on the first aggregated data, wherein the first user interface may include a graphical representation of the plurality of network devices provided in the potential network plan, and a graphical representation of the links interconnecting the plurality of network devices provided in the potential network plan. The method may include providing the first user interface to a client device, and receiving, from the client device, information indicating a first interaction with the first user interface. The method may include aggregating the first aggregated data used to generate the first user interface, based on the information indicating the first interaction, to generate second aggregated data, and generating a second user interface associated with the potential network plan based on the second aggregated data. The method may include providing, to the client device, the second user interface associated with the potential network plan.

According to some implementations, a device may include one or more memories, and one or more processors, communicatively coupled to the one or more memories, to determine a plurality of potential network plans for a network based on constraints and network data, wherein the network may include a plurality of network devices interconnected by links. The one or more processors may identify a potential network plan, of the plurality of potential network plans, that minimizes costs associated with operating the network, and may aggregate the network data associated with the potential network plan to generate first aggregated data. The one or more processors may generate a first user interface associated with the potential network plan based on the first aggregated data, wherein the first user interface may include a graphical representation of the plurality of network devices provided in the potential network plan, and a graphical representation of the links interconnecting the plurality of network devices provided in the potential network plan. The one or more processors may provide the first user interface to a client device, and may receive, from the client device, information indicating a first interaction with the first user interface. The one or more processors may aggregate the first aggregated data used to generate the first user interface, based on the information indicating the first interaction, to generate second aggregated data, and may generate a second user interface associated with the potential network plan based on the second aggregated data, wherein the second user interface may include a graphical representation of a plurality of sites provided in the potential network plan, wherein each site may represent a set of the plurality of network devices, and a graphical representation of links interconnecting the plurality of sites provided in the potential network plan. The one or more processors may provide, to the client device, the second user interface associated with the potential network plan.

According to some implementations, a non-transitory computer-readable medium may store instructions that, when executed by one or more processors of a device, may cause the one or more processors to aggregate network data associated with a potential network plan to generate first aggregated data, wherein the potential network plan may be determined, based on the network data, for a network that includes a plurality of network devices interconnected by links. The one or more instructions may cause the one or more processors to generate a first user interface associated with the potential network plan based on the first aggregated data, wherein the first user interface may include a graphical representation of the plurality of network devices provided in the potential network plan, and a graphical representation of the links interconnecting the plurality of network devices provided in the potential network plan. The one or more instructions may cause the one or more processors to provide the first user interface to a client device, and receive, from the client device, information indicating a first interaction with the first user interface. The one or more instructions may cause the one or more processors to aggregate the first aggregated data used to generate the first user interface, based on the information indicating the first interaction, to generate second aggregated data, and generate a second user interface associated with the potential network plan based on the second aggregated data, wherein the second user interface may include a graphical representation of a plurality of sites provided in the potential network plan, wherein each site may represent a set of the plurality of network devices, and a graphical representation of links interconnecting the plurality of sites provided in the potential network plan. The one or more instructions may cause the one or more processors to provide, to the client device, the second user interface associated with the potential network plan, and receive, from the client device, information indicating a second interaction with the second user interface. The one or more instructions may cause the one or more processors to aggregate the second aggregated data used to generate the second user interface, based on the information indicating the second interaction, to generate third aggregated data. The one or more instructions may cause the one or more processors to generate a third user interface associated with the potential network plan based on the third aggregated data, and provide, to the client device, the third user interface associated with the potential network plan.

DETAILED DESCRIPTION

Figure 1A:
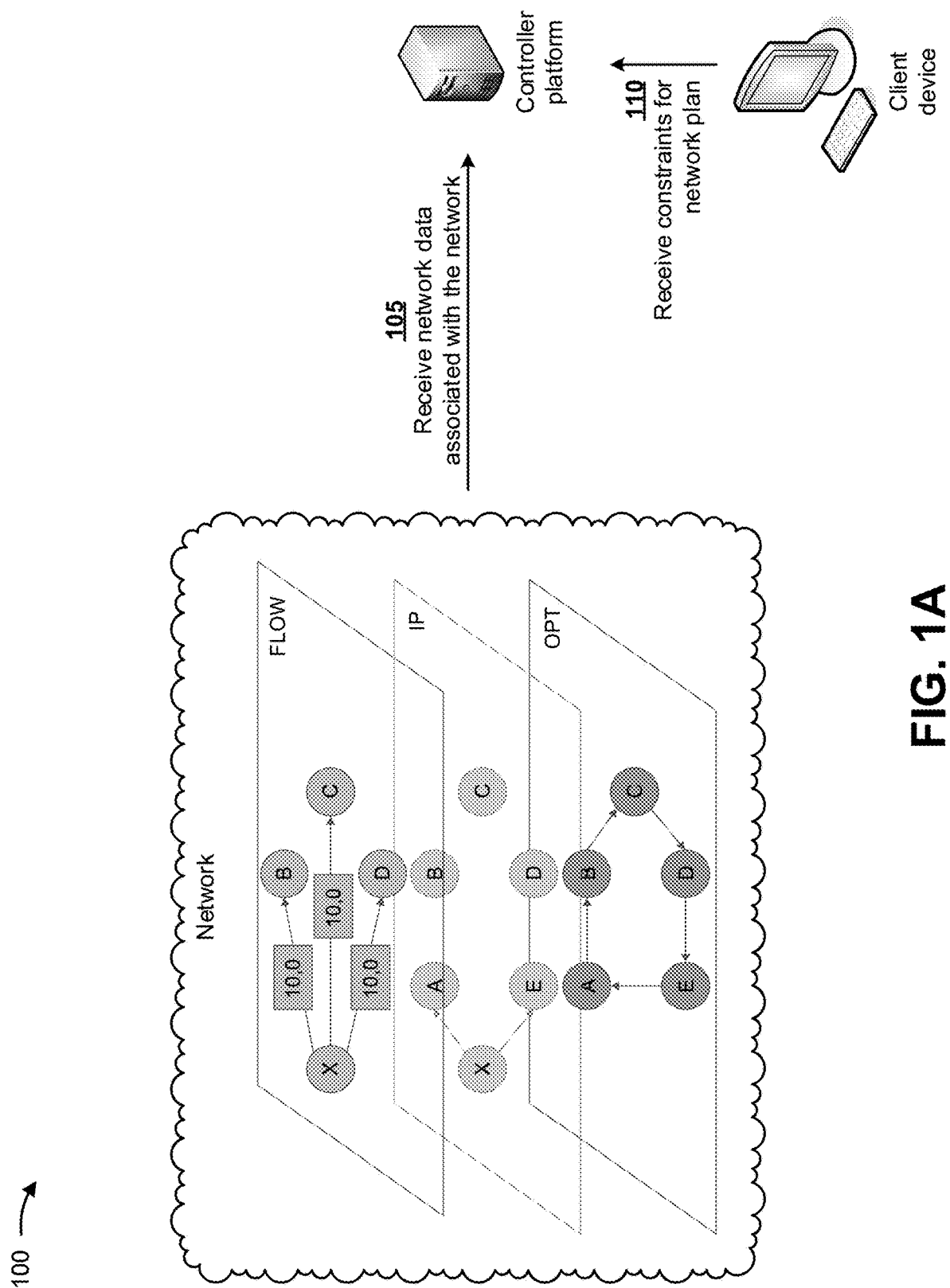
FIGS. 1A-1N are diagrams of one or more example implementations described herein.

The following detailed description of example implementations refers to the accompanying drawings. The same reference numbers in different drawings may identify the same or similar elements.

A network planning and design system may design a network that includes network devices (e.g., routers, switches, gateways, firewalls, and/or the like) and links provided between the network devices. However, if the network to be designed is large (e.g., includes hundreds, thousands, etc. of network devices and/or links), the network planning and design system may generate a network plan that is complex and difficult to visualize and understand. The time spent attempting to understand a complex network plan may cause the network planning and design system to overuse computing resources (e.g., processing resources, memory resources, and/or the like), networking resources, and/or the like. Furthermore, a sub-optimal network plan that is not understood may still be implemented, which may waste computing resources, networking resources, and/or the like associated with identifying a sub-optimal network plan, correcting inefficient network operation caused by the sub-optimal network plan, correcting inefficient use of network resources caused by the sub-optimal network plan, and/or the like.

Some implementations described herein provide a controller platform that provides interactive user interfaces for displaying features of an optimized network plan. For example, the controller platform may receive network data associated with a network that includes multiple network devices interconnected by links, and may receive constraints associated with determining a network plan for the network. The controller platform may determine multiple potential network plans for the network based on the constraints and the network data, and may identify a potential network plan, of the multiple potential network plans, that minimizes costs associated with operating the network. The controller platform may aggregate the network data associated with the potential network plan to generate first aggregated data, and may generate a first user interface associated with the potential network plan based on the first aggregated data. The first user interface may include a graphical representation of the multiple network devices provided in the potential network plan, and a graphical representation of the links interconnecting the multiple network devices provided in the potential network plan. The controller platform may provide the first user interface to a client device, and may receive, from the client device, information indicating a first interaction with the first user interface. The controller platform may aggregate the first aggregated data used to generate the first user interface, based on the information indicating the first interaction, to generate second aggregated data, and may generate a second user interface associated with the potential network plan based on the second aggregated data. The controller platform may provide, to the client device, the second user interface associated with the potential network plan.

In this way, the controller platform may provide interactive user interfaces that provide a clear understanding of a network plan and prevent implementation of sub-optimal network plans. This, in turn, conserves computing resources (e.g., processing resources, memory resources, and/or the like), networking resources, and/or the like that would otherwise be wasted in identifying a sub-optimal network plan, correcting inefficient network operation caused by the sub-optimal network plan, correcting inefficient utilization of network resources caused by the sub-optimal network plan, and/or the like.

Figure 1B:
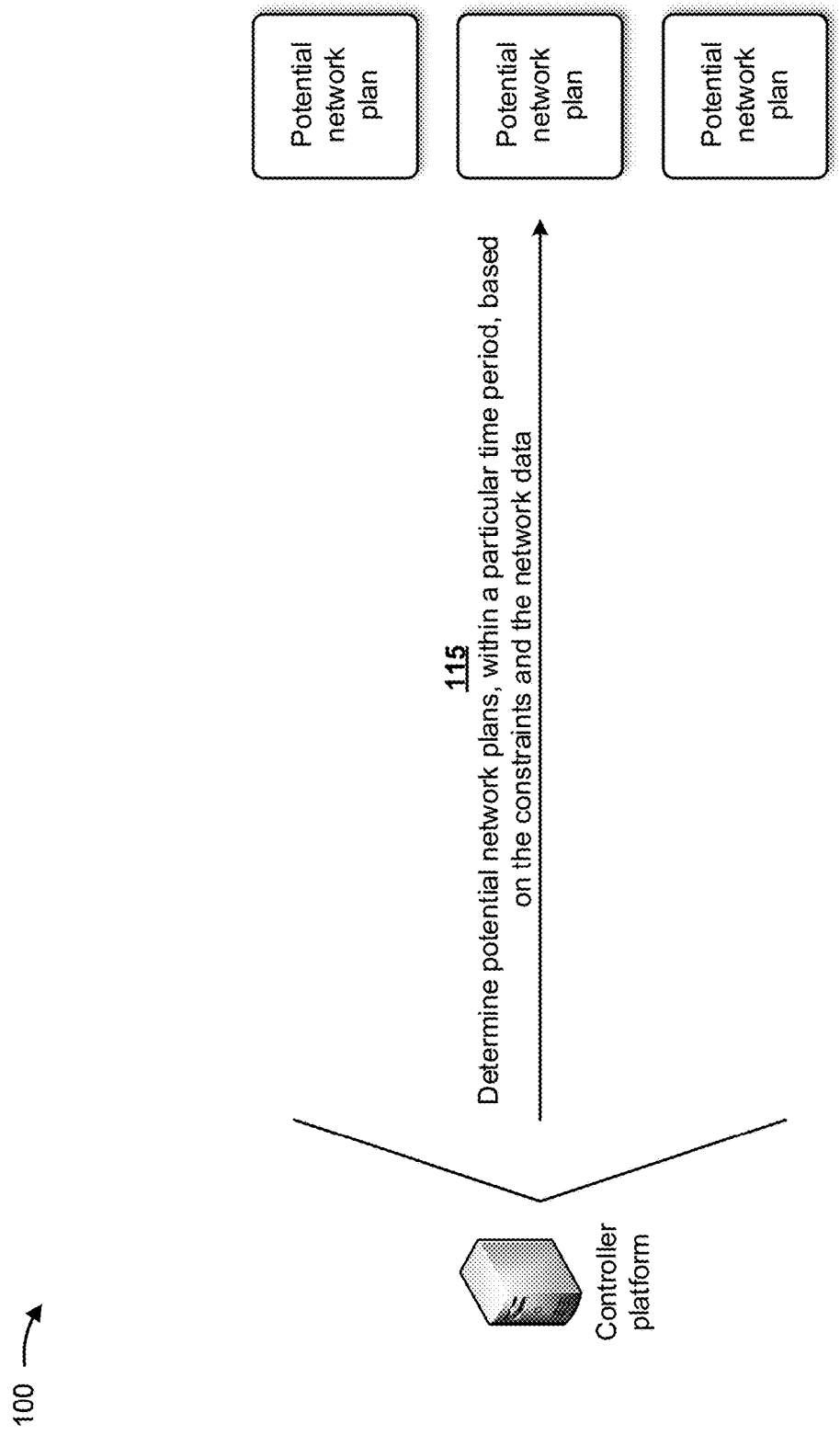
Figure 1C:
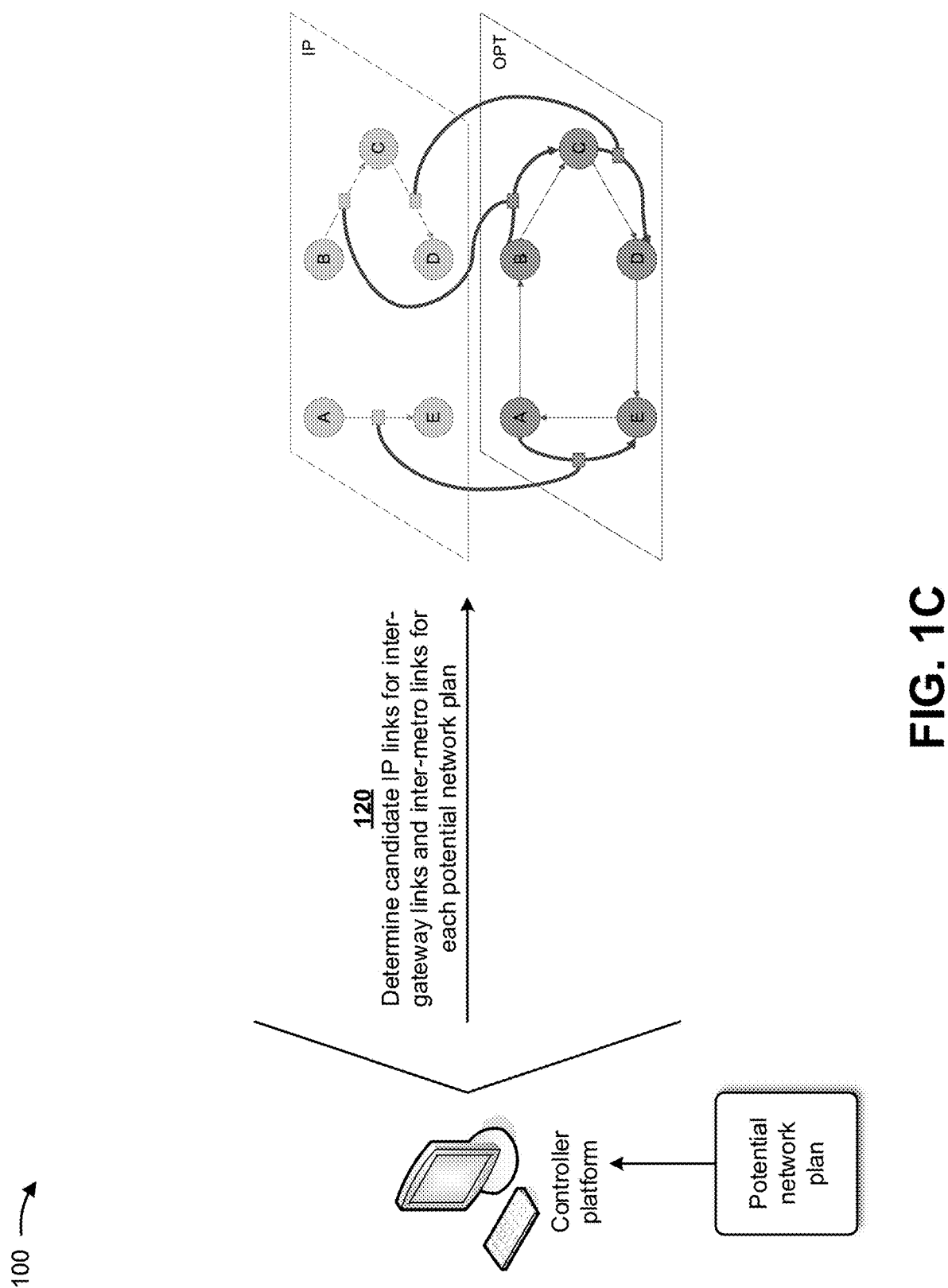
Figure 1D:
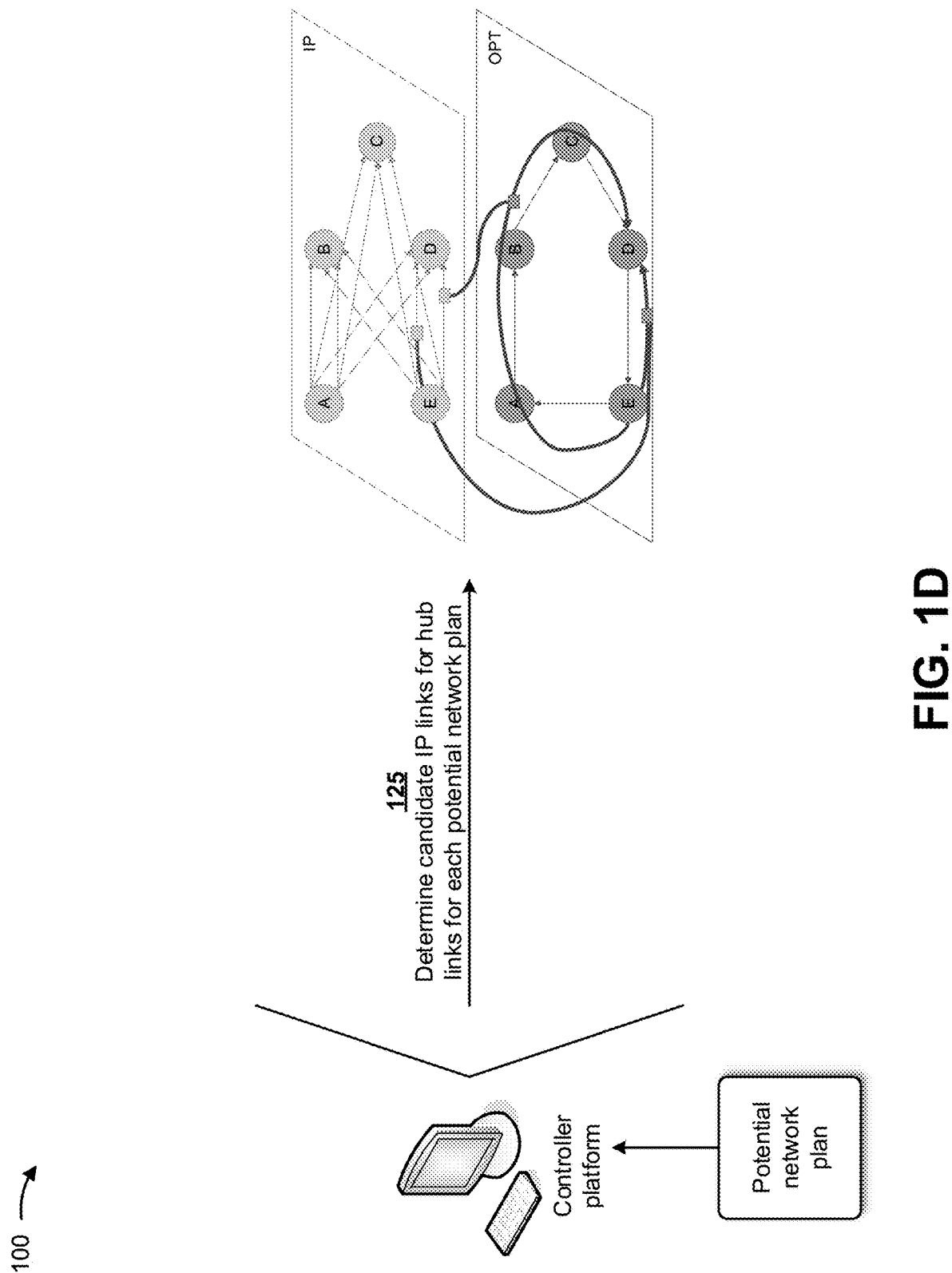
Figure 1E:
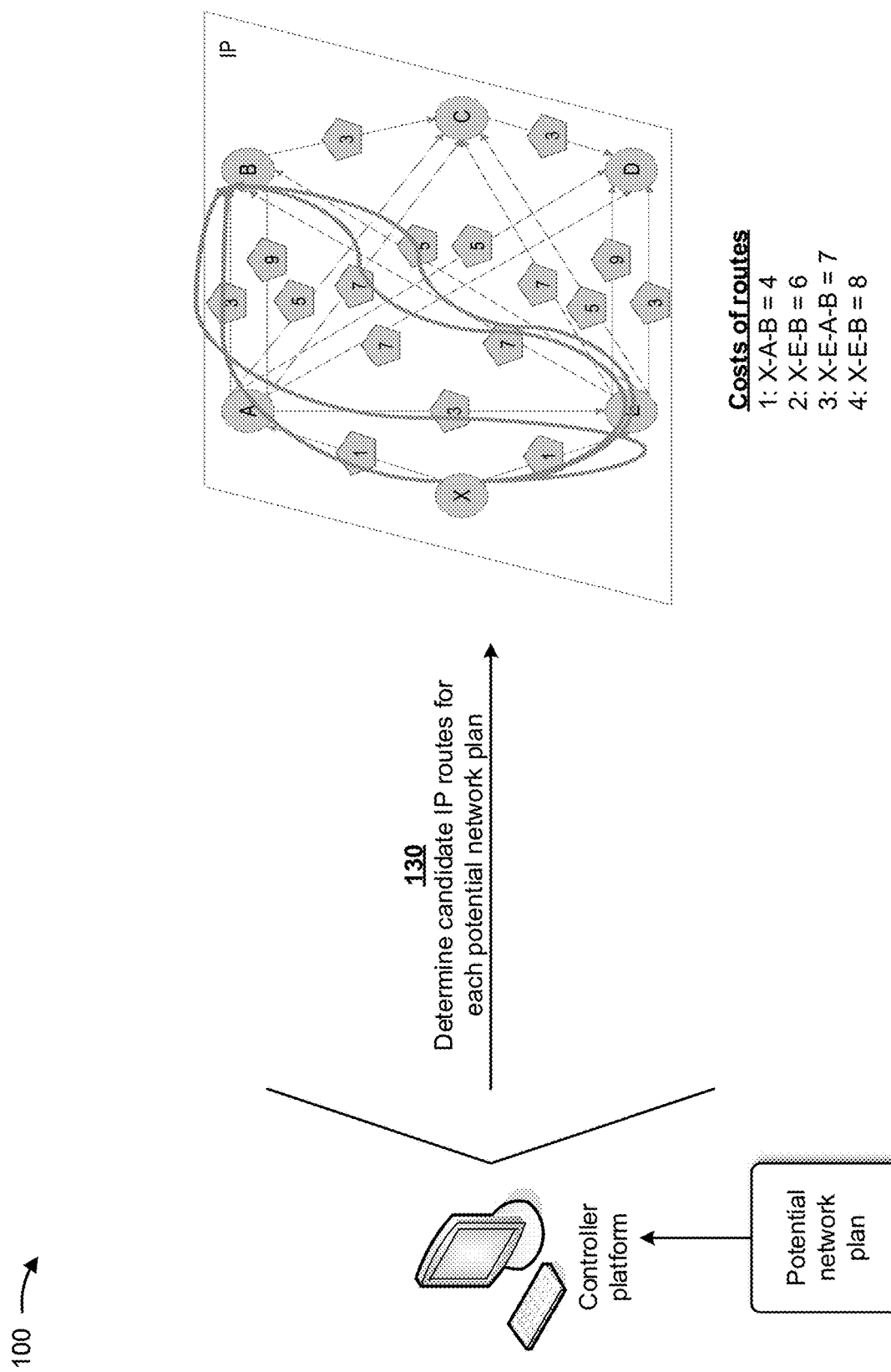
Figure 1F:
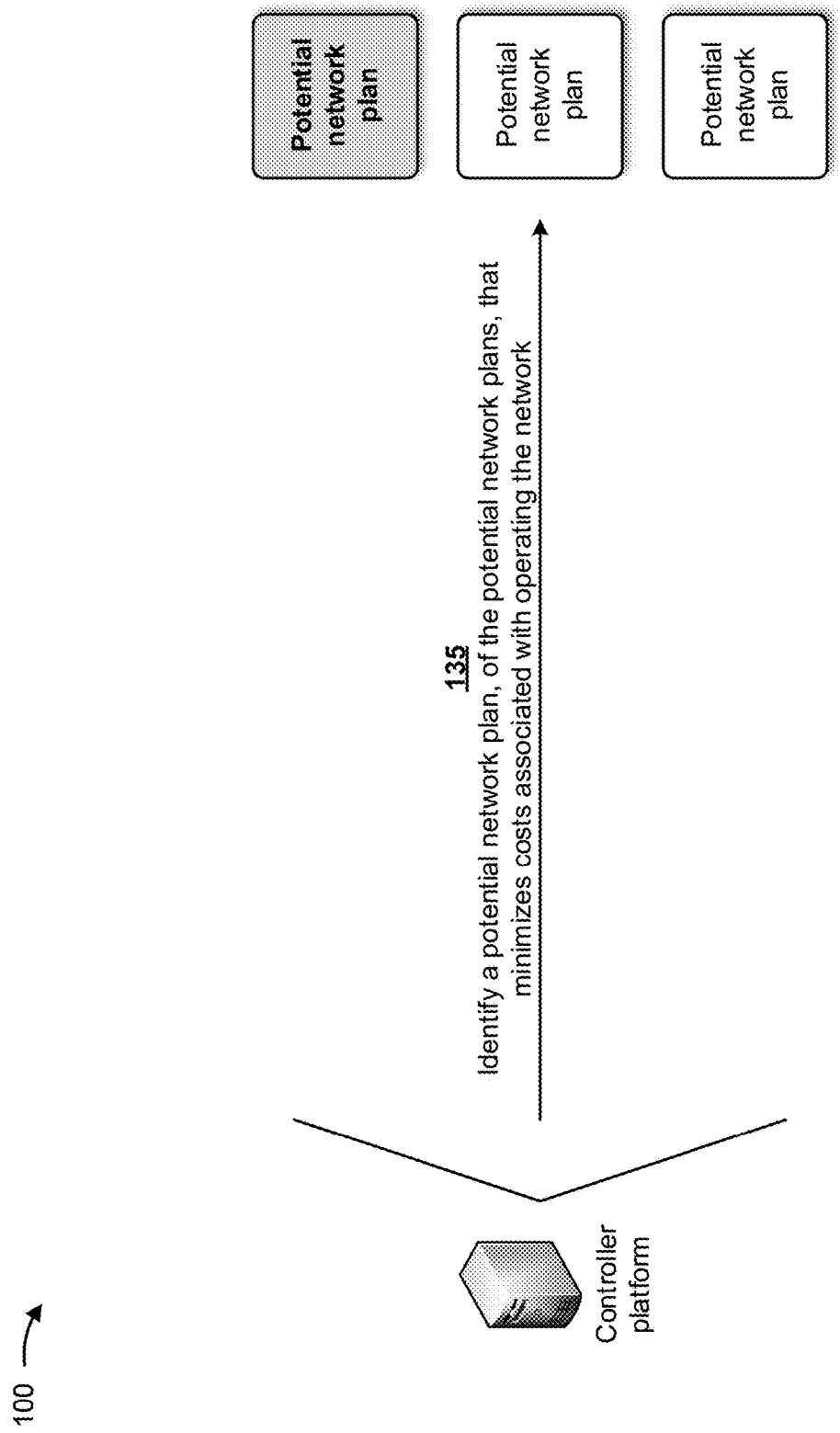
Figure 1G:
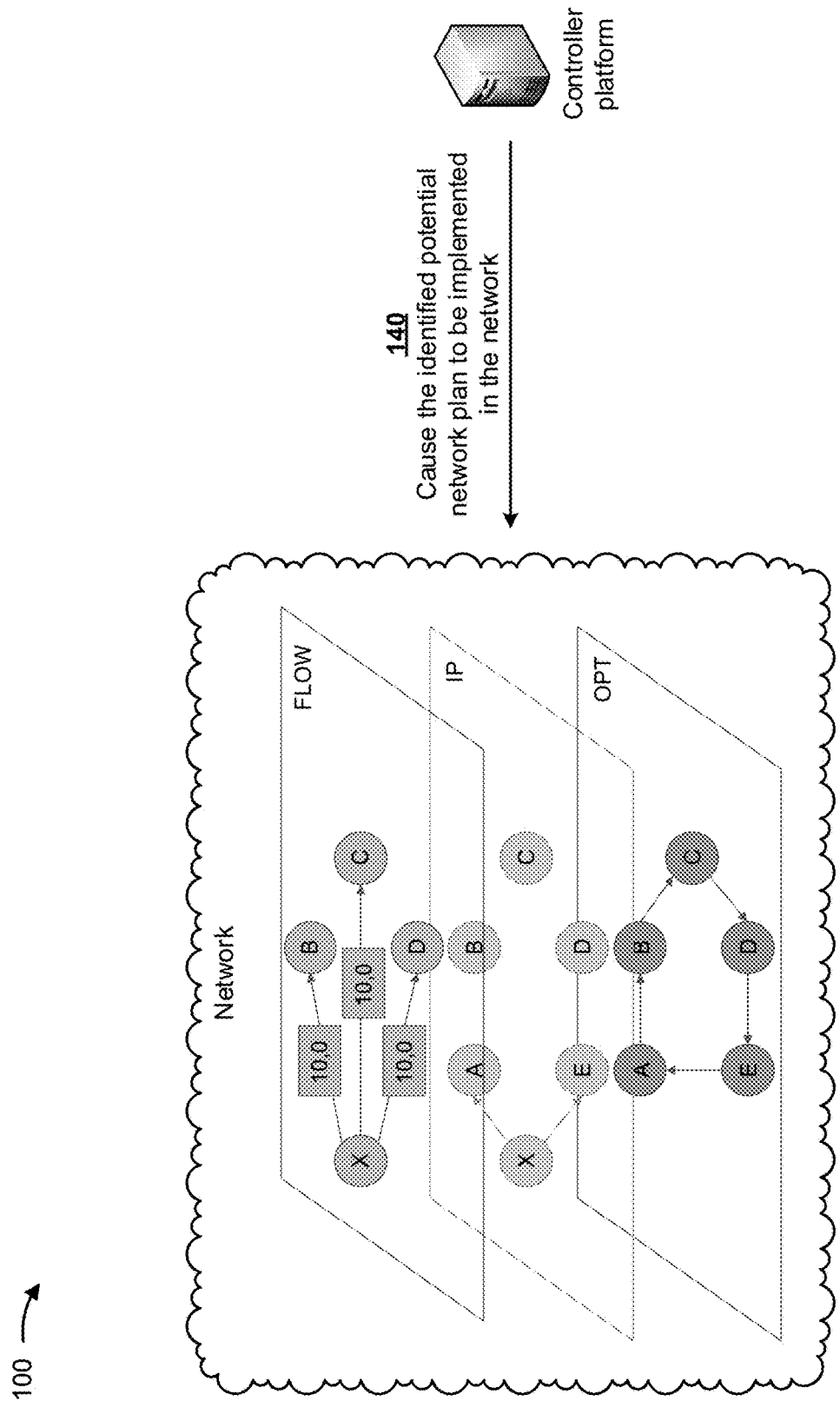
Figure 1H:
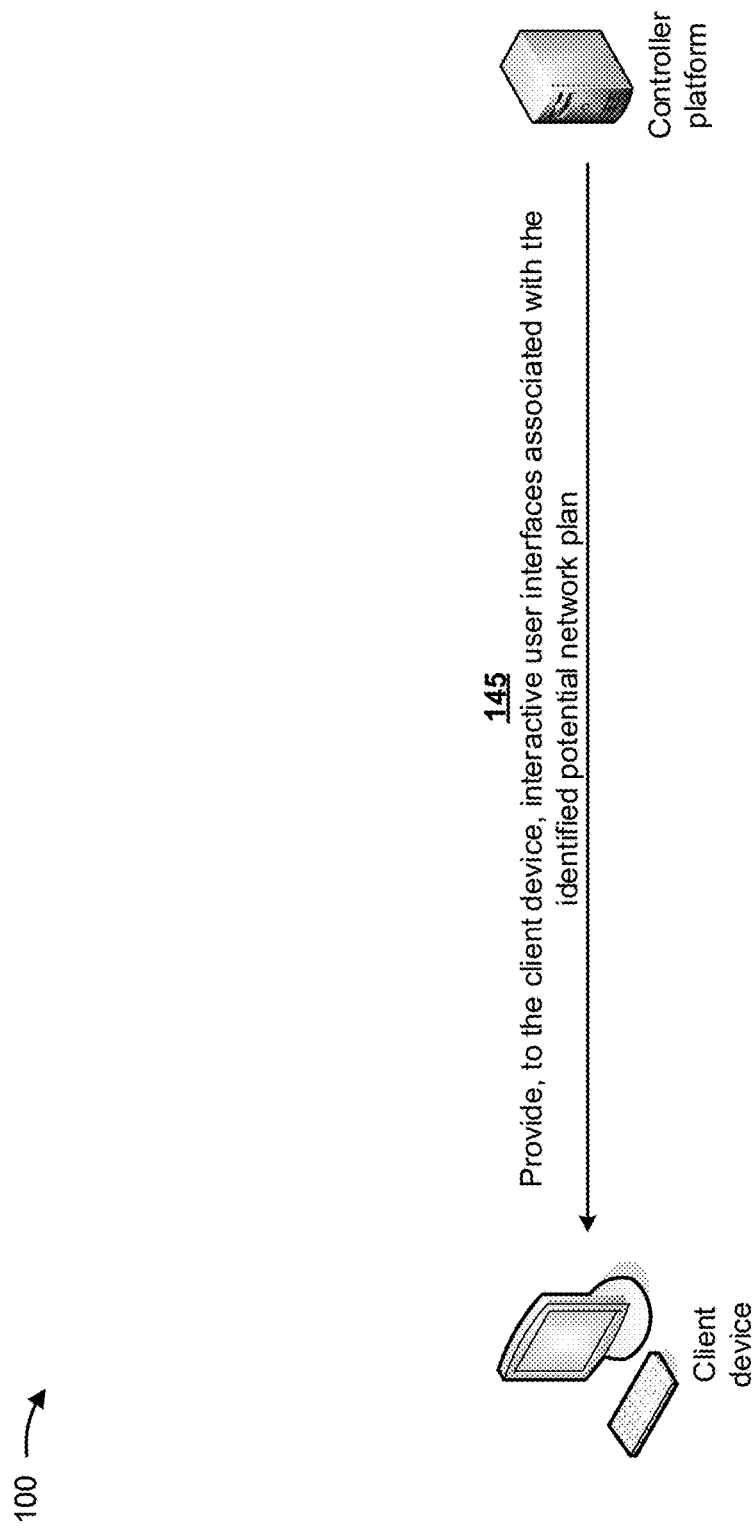
Figure 1I:
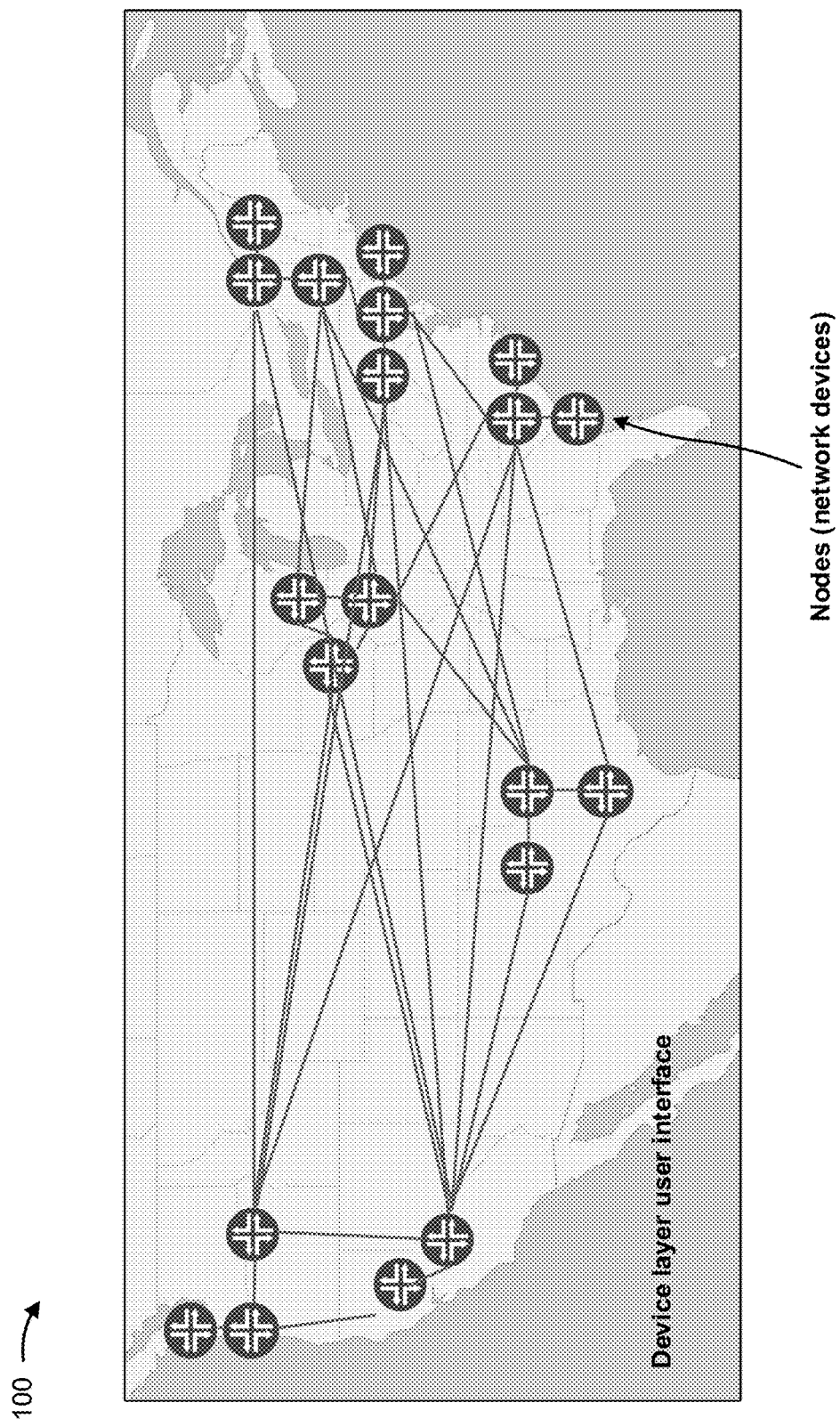
Figure 1J:
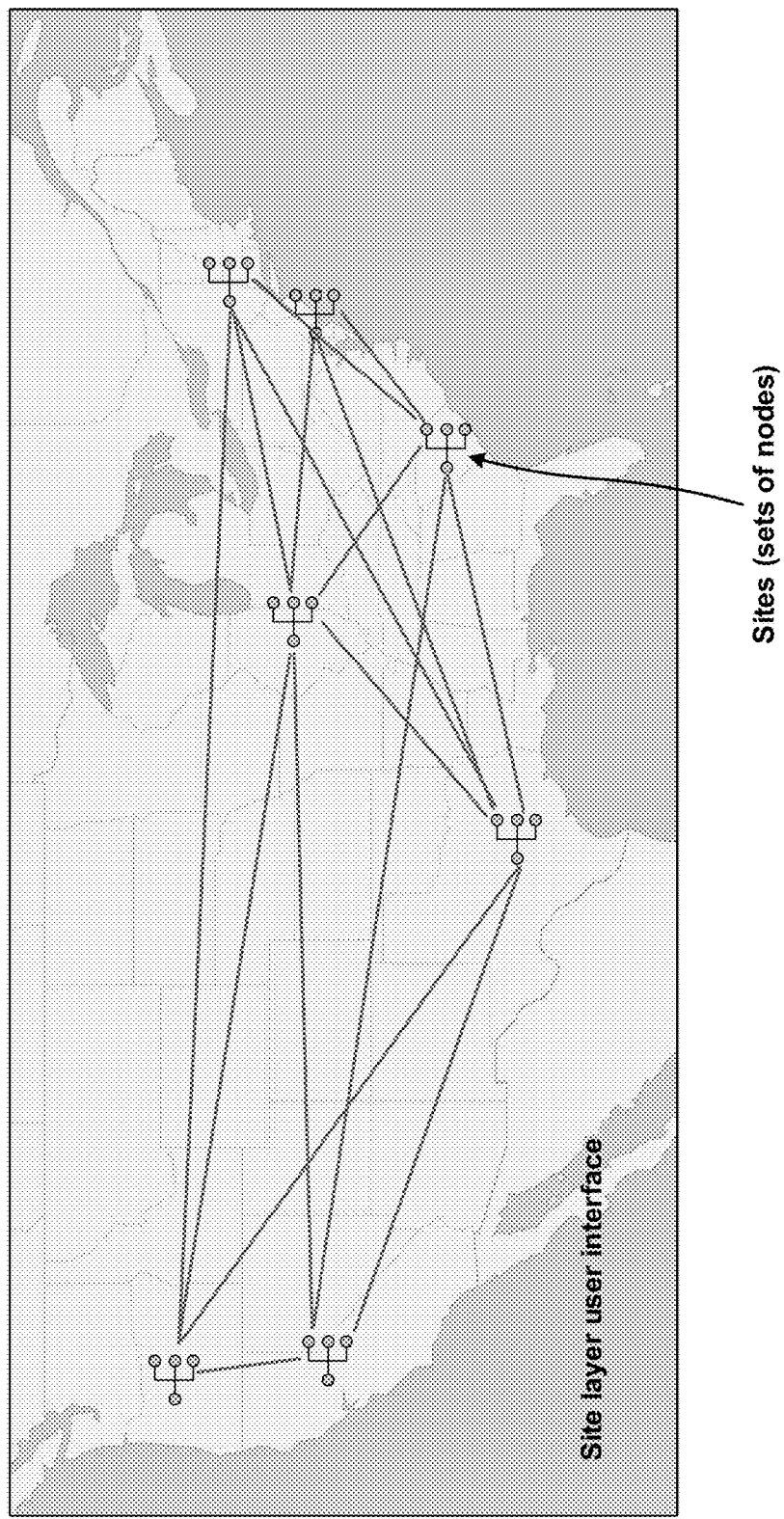
Figure 1K:
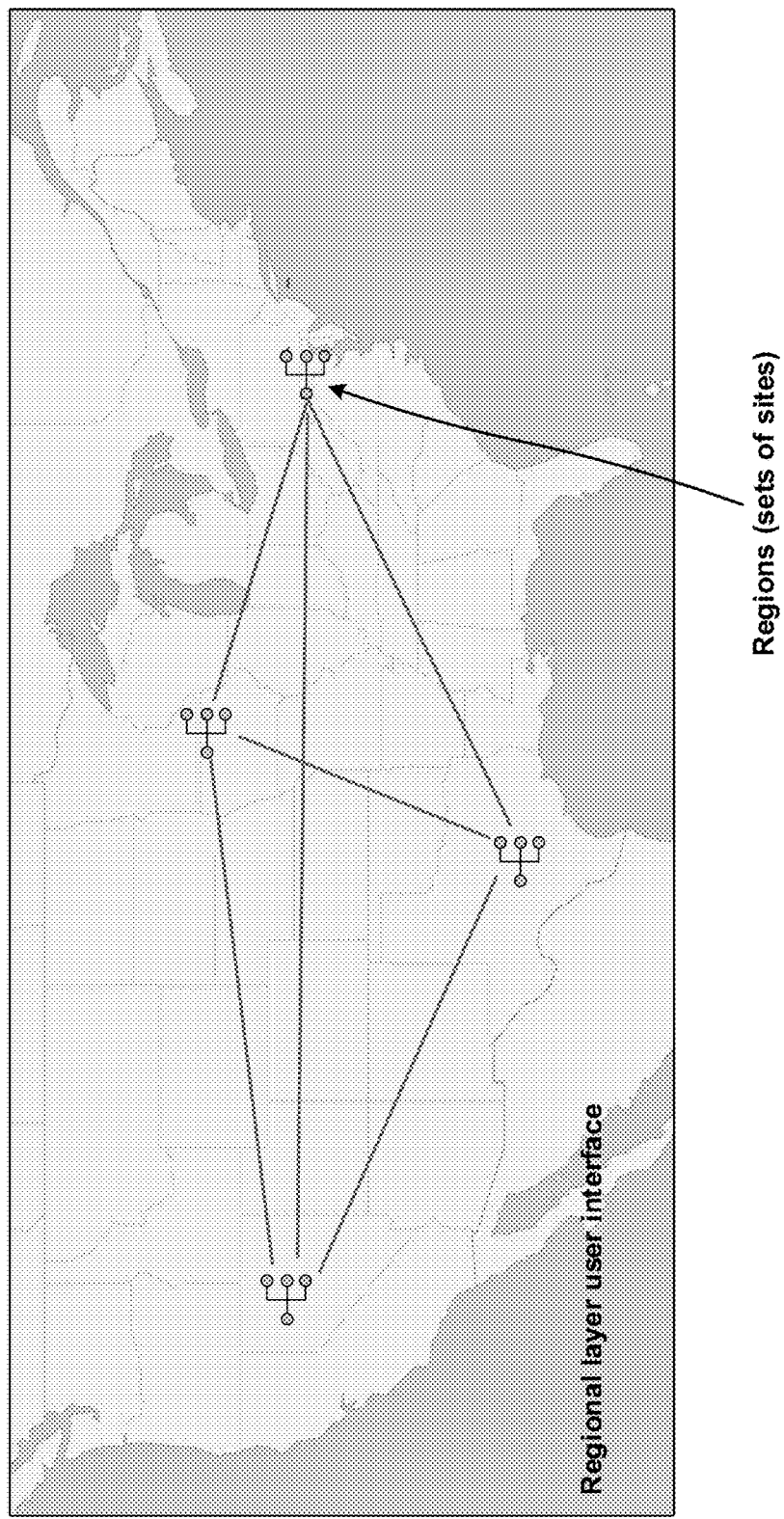
Figure 1L:
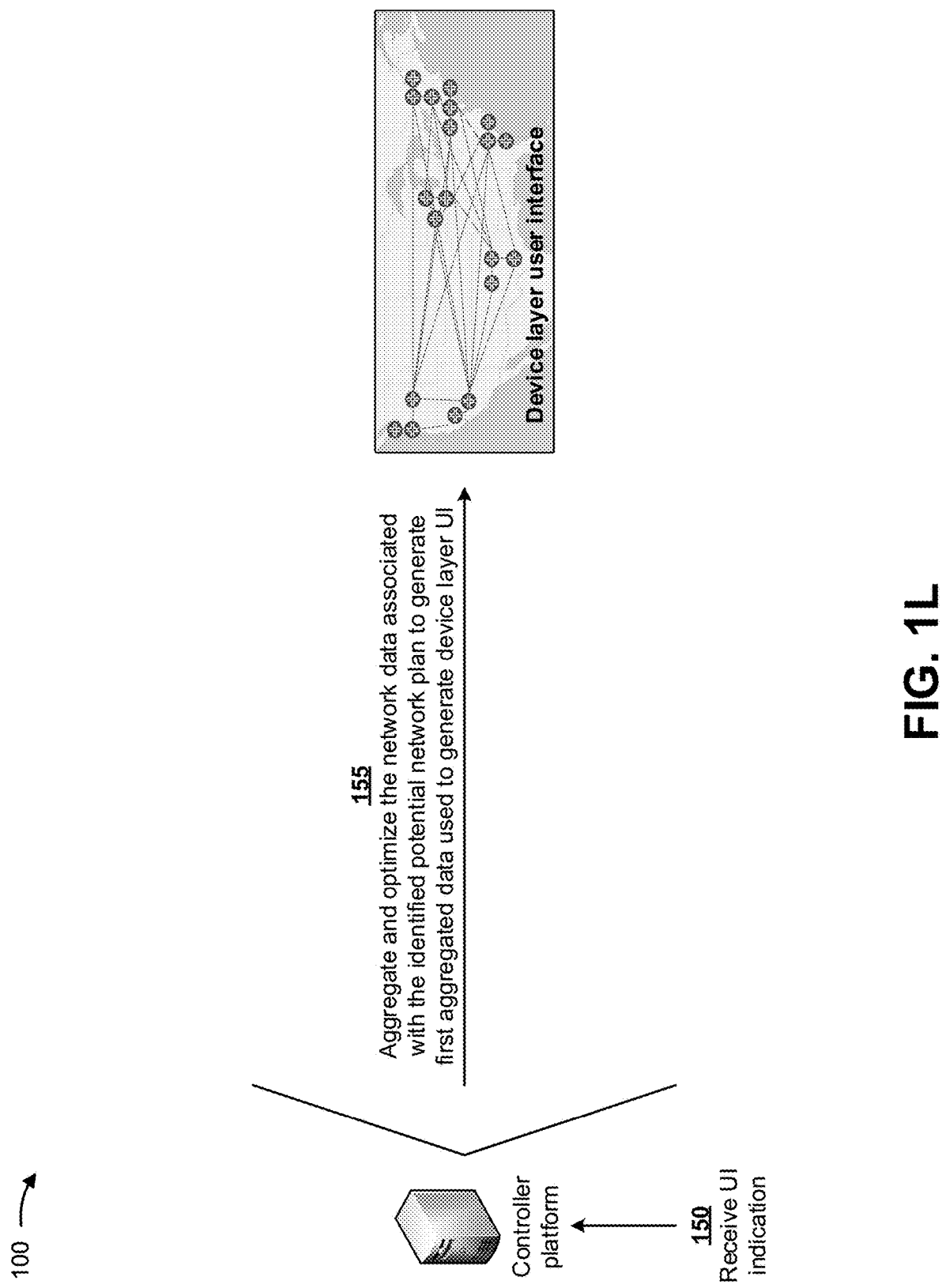
Figure 1M:
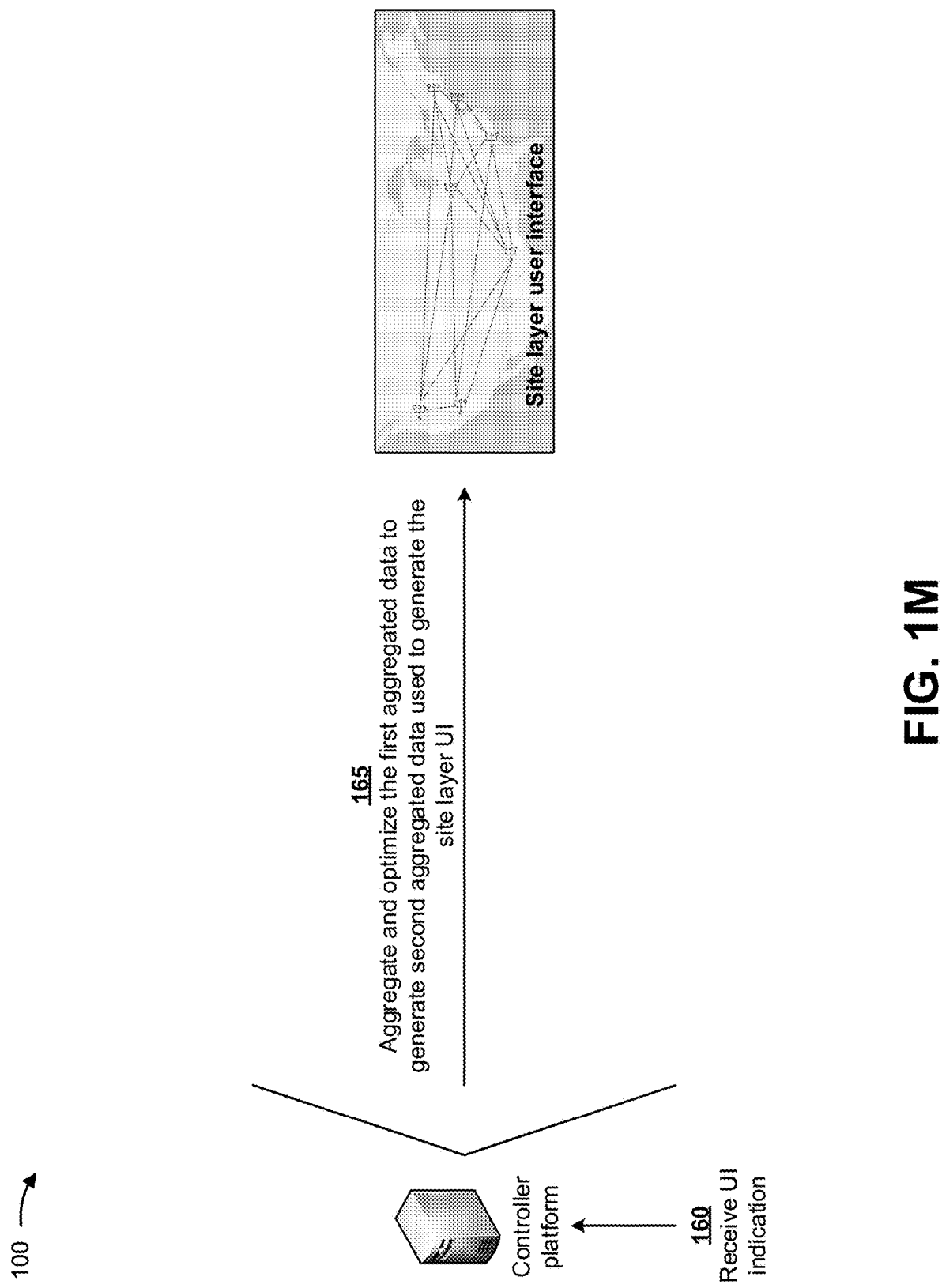
Figure 1N:
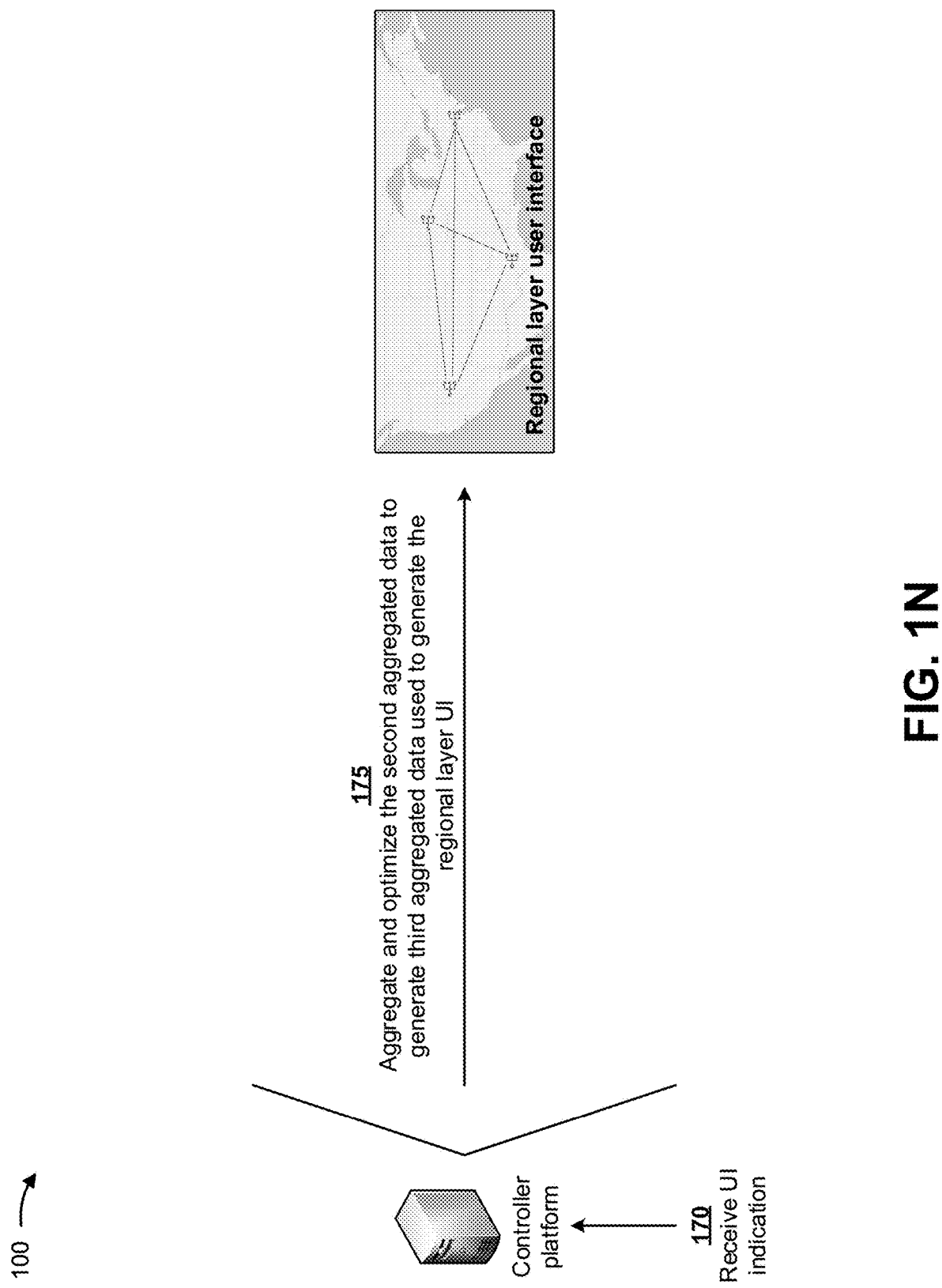

FIGS. 1A-1N are diagrams of one or more example implementations 100 described herein. As shown in FIG. 1A, a network may be associated with a controller platform. In some implementations, the network may include a packet optical network with multiple network devices and multiple links provided between the multiple network devices. In some implementations, the network may include multiple network layers, such as a flow layer, an Internet protocol (IP) or packet layer, an optical layer, and/or the like. The network may include multiple sites (e.g., A, B, C, D, and E), a pseudo site (e.g., X) that represents the Internet, and demands at the flow layer (e.g., a demand, at the flow layer between sites X and C, of ten (10) megabits per second (Mb/s) in a forward direction and zero (0) Mb/s in a reverse direction). The network may require assignment of network devices and/or links to the sites at the IP and optical layers. Indications may be provided between the flow and IP layers and may represent a quantity of traffic carried by a route or routes in the IP layer to satisfy traffic demands of the flow layer. Indications may be provided in the IP layer and may represent a capacity of IP links, where the capacity of an IP link may be at least a sum of all traffic carried by all routes that use the IP link. Similar relationships may exist between the IP and optical layers where the links of the IP layer may induce demands to be routed at the optical layer. One difference is that traffic units at the optical layer may be different (e.g., in lambdas instead of MB/s), so a conversion may be performed before determining whether a link at the optical layer includes sufficient capacity for routes that depend on the link.

As further shown in FIG. 1A, and by reference number 105, the controller platform may receive network data associated with the network. In some implementations, the network data may include topology data associated with the network, path data associated with the network, and/or the like. The topology data may include data identifying the network devices (e.g., data identifying types of the network devices, network identifiers of the network devices, locations of the network devices, hardware and/or software associated with the network devices, other network devices that are adjacent to the network devices, links connected to the network devices, ports associated with the network devices, and/or the like), the links interconnecting the network devices (e.g., data identifying types of the links, protocols used by the links, network devices to which the links are connected, ports associated with the network devices, and/or the like), utilizations of the network devices (e.g., capacities of the network devices, throughputs of the network devices, and/or the like), and/or the like. The path data may include data identifying paths through the network provided by the network devices, sources (e.g., one or more of the network devices, and/or the like) of the paths through the network, destinations (e.g., one or more of the network devices, and/or the like) of the paths through the network, utilizations of the paths through the network (e.g., capacities of the paths, throughputs of the paths, and/or the like), and/or the like.

The controller platform may periodically receive the network data from the network (e.g., at particular time intervals in seconds, minutes, hours, days, and/or the like), may continuously receive the network data from the network, and/or the like. For example, the controller platform may provide, to the network devices, a request for the network data, and the network devices may provide the network data to the controller platform based on the request.

As further shown in FIG. 1A, and by reference number 110, the controller platform may receive (e.g., from a client device) constraints associated with a network plan. In some implementations, the constraints may include a constraint indicating a particular time period associated with determining the network plan for the network, a constraint indicating a failure threshold associated with paths provided through the network by the network devices and the links, a constraint indicating capacities of the links, a constraint indicating possible paths for a traffic demand of the network, a constraint indicating no possible paths for the traffic demand, and/or the like. The constraint indicating the failure threshold may include a threshold count associated with a traffic demand failure by the network plan (e.g., discard a network plan that includes traffic demand failures exceeding the threshold count). The threshold count may be based on capacities of the links, a set of possible paths through the network for a traffic demand, and/or a constraint indicating whether there is a certain path for the traffic demand or no possible path for the traffic demand.

Although FIG. 1A shows specific quantities of sites, nodes, network devices, links, and/or the like, in some implementations, the network may include more sites, nodes, network devices, links, and/or the like than depicted in FIG. 1A. For example, the network may include hundreds, thousands, and/or the like of network devices and/or links that generate thousands, millions, billions, etc. of data points. In this way, the controller platform may handle thousands, millions, billions, etc., of data points within a time period (e.g., when determining network plans), and thus may provide "big data" capability.

As shown in FIG. 1B, and by reference number 115, the controller platform may determine potential network plans, within a particular time period (e.g., as specified by the constraint indicating the particular time period associated with determining the network plan), based on the constraints and the network data. For example, if the particular time period is small (e.g., in seconds or minutes), the controller platform may determine a first quantity of potential network plans, and if the particular time period is larger (e.g., in minutes or hours), the controller platform may determine a second quantity of potential network plans that is larger than the first quantity of potential network plans. Thus, the particular time period may be utilized (e.g., by a user of the controller platform) to determine resource usage of the controller platform and/or the quantity of potential network plans generated by the controller platform.

In some implementations, the controller platform may assign costs to the potential network plans based on a variety of factors, such as quantities of network devices utilized in the potential network plans, quantities and lengths of links utilized in the potential network plans, utilizations of utilized network devices, utilizations of the links, and/or the like. For example, each factor may be associated with a respective cost (e.g., a link may cost more than a network device), and the controller platform may assign the respective costs to the different factors based on the potential network plan. In some implementations, the controller platform may determine penalties associated with failures of the potential network plans in meeting traffic demands of the network, and may add the penalties to the costs assigned to the potential network plans.

In some implementations, if one of the potential network plans fails to satisfy the constraint indicating the failure threshold (e.g., if the one of the potential network plans includes traffic demand failures that exceed the failure threshold), the controller platform may remove the one of the potential network plans from consideration, may flag the one of the potential network plans, and/or the like.

As shown in FIG. 1C, and by reference number 120, the controller platform, when determining the potential network plans, may determine candidate IP links for inter-gateway links (e.g., inter-gateway link AE) and inter-metro links (e.g., inter-metro links BC and CD) for each potential network plan. Each site (e.g., A, B, C, D, and E) may include one multilayer node. In the IP layer, nodes A and E may represent Internet gateways, and nodes B, C, and D may represent access nodes to which customers connect. The traffic flow demands in this example may be 100 Mb/s from X (shown in FIG. 1A) to each of nodes B, C, and D. The IP layer may include links from X to nodes A and E which do not need to be routed in the optical layer. The optical layer may include a metro ring around the five nodes. In this example, the controller platform may determine candidate IP links for inter-gateway links (e.g., links connecting gateways and access nodes that include a single direct one hop route in the optical layer) and for inter-metro links.

As shown in FIG. 1D, and by reference number 125, the controller platform, when determining the potential network plans, may determine candidate IP links for hub links for each potential network plan. For example, the controller platform may determine hub links between gateway-access node pairs (e.g., two hub links between AB, AC, AD, EB, EC, and ED), where for each gateway-access node pair, two links may include one route clockwise around the metro ring, and another route counterclockwise around the metro ring). The controller platform may associate costs with the hub links (e.g., a cost of three (3) for a first optical layer hop and a cost of two (2) for each additional hop). In this example, the flow layer links may be routed over the IP links with the four shortest routes being included in the potential network plan as candidate links.

As shown in FIG. 1E, and by reference number 130, the controller platform, when determining the potential network plans, may determine candidate IP paths for each potential network plan. For example, the controller platform may determine a first candidate IP path of X-A-B (e.g., with a cost of four), a second candidate IP path of X-E-B (e.g., with a cost of six), a third candidate IP path of X-E-A-B (e.g., with a cost of seven), and a fourth candidate IP path of X-E-B (e.g., with a cost of eight). Once the candidate IP links and the candidate IP paths are determined, the controller platform may determine the potential network plans based on the candidate IP links and the candidate IP paths. For example, the controller platform may select candidate IP links and candidate IP paths for a potential network plan, and may determine a cost associated with the potential network plan. The controller platform may select different candidate IP links and candidate IP paths in an attempt to reduce the cost associated with the potential network plan.

As shown in FIG. 1F, and by reference number 135, the controller platform may identify a potential network plan, of the potential network plans, that minimizes costs associated with operating the network (e.g., reduces resource usage by the network). In some implementations, the controller platform may compare the costs determined for each of the potential network plans, and may select a potential network plan with a lowest cost. In some implementations, the controller platform may select a potential network plan with a lowest quantity of traffic demand failures, even if the potential network plan does not include the lowest cost. The controller platform may select a potential network plan with a lowest quantity of traffic demand failures and a lowest cost. In some implementations, the controller platform may provide information identifying the potential network plans to a client device, and may receive a selection of a potential network plan from the client device. The controller platform may utilize the potential network plan identified by the selection.

In some implementations, the controller platform may identify a potential network plan, of the potential network plans, that maximizes throughput associated with operating the network (e.g., reduces resource usage by the network). The controller platform may assign throughputs to the potential network plans based on a variety of factors, such as quantities of network devices utilized in the potential network plans, quantities and lengths of links utilized in the potential network plans, utilizations of utilized network devices, utilizations of the links, and/or the like. For example, each factor may be associated with a respective throughput (e.g., a particular type of network device may have greater throughput than another type of network device), and the controller platform may assign the respective throughputs to the different factors based on the potential network plan.

In some implementations, the controller platform may compare the throughputs and/or costs determined for each of the potential network plans, and may select a potential network plan with a highest throughput and/or a lowest cost. In some implementations, the controller platform may select a potential network plan with a lowest quantity of traffic demand failures, even if the potential network plan does not provide the highest throughput and/or the lowest cost. The controller platform may select a potential network plan with a lowest quantity of traffic demand failures, a highest throughput, and/or a lowest cost. The controller platform may assign weights to the traffic demand failures, the throughput, and the costs, and may select a potential network plan based on the assigned weights. In some implementations, the controller platform may provide information identifying the potential network plans to a client device, and may receive a selection of a potential network plan from the client device. The controller platform may utilize the potential network plan identified by the selection.

As shown in FIG. 1G, and by reference number 140, the controller platform may cause the identified potential network plan to be implemented in the network. For example, the controller platform may cause links and paths associated with the identified network plan to be implemented by the network devices and the links of the network. In some implementations, the controller platform may cause the identified potential network plan to be implemented in the network by providing, to one or more of the network devices, instructions indicating that the one or more network devices, and the links associated with the one or more network devices, are to implement the identified potential network plan. The one or more network devices may receive the instructions and may implement the identified potential network plan based on the instructions. For example, the controller device may provide, to three network devices, instructions indicating that the three network devices (e.g., and two links provided between the three network devices) are to reserve bandwidth for a traffic demand. The three network devices may receive the instructions and may reserve the bandwidth for the traffic demand based on the instructions.

In some implementations, network devices may receive instructions indicating that the network devices, and the links associated with the network devices, are to implement the identified potential network plan, and may configure forwarding and routing tables of the network devices with information associated with the identified network plan (e.g., based on the instructions). In some implementations, the controller platform may receive, from a client device and via a user interface, an input indicating that the potential network plan is to be implemented in the network, and may cause, based on the input, the potential network plan to be implemented in the network by the network devices.

In some implementations, the controller platform may receive additional network data from the network based on causing the identified potential network plan to be implemented in the network, and may modify the identified potential network plan based on the additional network data to generate a modified potential network plan. For example, if the additional network data indicates that a portion of the network is failing to manage a new traffic demand, the controller platform may modify the identified potential network plan to manage the new traffic demand. The controller platform may then cause the modified potential network plan to be implemented in the network, as described above.

In some implementations, the controller platform may generate interactive user interfaces associated with a potential network plan for the network. For example, the controller platform may utilize information associated with the potential network plan to generate the interactive user interfaces. The user interfaces may include direct manipulation interfaces with graphical objects in a view representing the potential network plan. The user interfaces may include a network map that is based around nodes, sites, regions, and/or the like, represented as icons at points on an x-y plane. Each site may represent a group of nodes provided at the site, and each region may represent a group of sites provided at the region. Lines may connect the nodes, sites, and/or the regions and may summarize connections between the nodes, sites, and/or the regions. The lines may represent flow links, IP routes, IP links, optical routes, optical links, and/or the like. The user interfaces may support selection of a site to show and hide the nodes provided at the selected site and the links or routes incident on those nodes. The user interfaces may support selection of a region to show and/or hide the sites provided at the selected region and the links or routes incident on those sites. Lines representing routes and links may be bowed when there is more than one route/link between a same pair of nodes on a same layer to differentiate between the routes/links. For routes and links where a specific traffic option has not been selected, a visual representation may utilize markings (e.g., colors and line widths) to suggest a range of traffic options under consideration.

Site coordinates in the network map may be geographic latitude and/or longitude, or may be logical, to spread the sites out with an even distribution on the network map to minimize line crossing. Links may be marked (e.g., colored and sized) to indicate an intensity of a traffic demand between the nodes, sites, and/or regions connected by the links. Routes may be marked (e.g., colored and sized) to indicate a fraction of an associated traffic demand carried by the routes (e.g., unused routes may include special markings, such as dashed lines). The user interfaces support creating, editing, and deleting all types of objects. The user interfaces also support selection of any object to expand or collapse details of relationships associated with the selected object. The relationships supported for expansion and collapse may include expanding a site to show nodes provided at the site, expanding a link to show routes that carry the link, expanding a route to show links in the route, expanding a link to show routes that use the link, and/or the like. The network map may support moving a view around in two-dimensional space with gestures to translate, scale, and rotate the view.

As shown in FIG. 1H, and by reference number 145, the controller platform may provide, to a client device and in near-real time, interactive user interfaces associated with the identified potential network plan. The client device may receive the interactive user interfaces associated with the potential network plan and may provide the interactive user interfaces associated with the potential network plan for display. The interactive user interfaces may enable a user of the client device to view features associated with the potential network plan, to see a graphical representation of the potential network plan, to select a potential network plan for implementation, and/or the like, as described below. In some implementations, the interactive user interfaces may include information that permits a user of the client device to modify one or more portions of the potential network plan. In some implementations, the controller platform may receive, from the client device and via the interactive user interfaces, a selection of a particular link provided between two of the sites, and may generate information associated with the particular link based on the selection of the particular link. The controller platform may provide, to the client device and via the interactive user interfaces, the information associated with the particular link.

In some implementations, the controller platform may determine costs associated with the potential network plans (e.g., based on the network data) and may generate an interactive user interface that includes information identifying the costs associated with the potential network plans. In some implementations, the controller platform may identify the potential network plan that minimizes the costs associated with operating the network based on the costs associated with the potential network plans, and may provide, to the client device and via the interactive user interfaces, information identifying a cost associated with the potential network plan.

As shown in FIG. 1I, the interactive user interfaces may include an interactive user interface that provides information identifying a device layer of the potential network plan. A user of the client device may utilize the interactive user interface to view features of the device layer of the potential network plan. As further shown, the interactive user interface may display a graphical representation (e.g., a two-dimensional view) of the device layer associated with the potential network plan. For example, the graphical representation of the device layer of the potential network plan may include graphical representations of nodes (e.g., network devices) to be utilized by the potential network plan. The user of the client device may view the graphical representation from multiple orientations (e.g., via movement of a mouse of the client device, via gestures with a touchpad of the client device, via gestures with a touchscreen of the client device, and/or the like) in order to fully visualize the device layer associated with the potential network plan. As further shown, the interactive user interface may display links to be provided between the nodes of the potential network plan.

As shown in FIG. 1J, the interactive user interfaces may include an interactive user interface that provides information identifying a site layer of the potential network plan. A user of the client device may utilize the interactive user interface to view features of the site layer of the potential network plan. As further shown, the interactive user interface may display a graphical representation (e.g., a two-dimensional view) of the site layer associated with the potential network plan. For example, the graphical representation of the site layer of the potential network plan may include graphical representations of sites (e.g., groups or sets of nodes) to be utilized by the potential network plan. The user of the client device may view the graphical representation from multiple orientations (e.g., via movement of a mouse of the client device, via gestures with a touchpad of the client device, via gestures with a touchscreen of the client device, and/or the like) in order to fully visualize the site layer associated with the potential network plan. As further shown, the interactive user interface may display links to be provided between the sites of the potential network plan.

As shown in FIG. 1K, the interactive user interfaces may include an interactive user interface that provides information identifying a regional layer of the potential network plan. A user of the client device may utilize the interactive user interface to view features of the regional layer of the potential network plan. As further shown, the interactive user interface may display a graphical representation (e.g., a two-dimensional view) of the regional layer associated with the potential network plan. For example, the graphical representation of the regional layer of the potential network plan may include graphical representations of regions (e.g., groups or sets of sites) to be utilized by the potential network plan. The user of the client device may view the graphical representation from multiple orientations (e.g., via movement of a mouse of the client device, via gestures with a touchpad of the client device, via gestures with a touchscreen of the client device, and/or the like) in order to fully visualize the regional layer associated with the potential network plan. As further shown, the interactive user interface may display links to be provided between the regions of the potential network plan.

As shown in FIG. 1L, and by reference number 150, the controller platform may receive (e.g., from the client device) a user interface indication that indicates an interaction with a user interface provided to the client device. For example, a user of the client device may provide the indication via an interaction with a user interface providing information associated with the potential network plan. The interaction may include the user requesting that a device layer user interface for the potential network plan be provided.

As further shown in FIG. 1L, and by reference number 155, based on the indication, the controller platform may aggregate and optimize the network data associated with the potential network plan to generate first aggregated data used to generate the device layer user interface. In some implementations, the first aggregated data may include the network data identifying the network devices (e.g., the nodes) associated with the potential network plan and the links interconnecting the identified network devices. In some implementations, the controller platform may generate the device layer user interface based on the first aggregated data. For example, the controller platform may utilize the network data identifying the network devices to generate graphical representations (e.g., icons) of the network devices, and may utilize the network data identifying the links interconnecting the identified network devices to generate graphical representations (e.g., lines) of the links.

As shown in FIG. 1M, and by reference number 160, the controller platform may receive (e.g., from the client device) a user interface indication that indicates an interaction with the device layer user interface provided to the client device. For example, the interaction may include the user requesting that a site layer user interface for the potential network plan be provided.

As further shown in FIG. 1M, and by reference number 165, based on the indication, the controller platform may aggregate and optimize the first aggregated data to generate second aggregated data used to generate the site layer user interface. In some implementations, the controller platform may process, based on the constraints, the first aggregated data to generate data associated with sets of the network devices included in the device layer user interface. Each set of the network devices may represent one of the sites included in the site layer user interface. The controller platform may generate the site layer user interface based on data associated with the sites.

In some implementations, the second aggregated data may include the data identifying sets or groups of network devices (e.g., the nodes) associated with the potential network plan and the links interconnecting the identified sets of network devices. In some implementations, the controller platform may generate the site layer user interface based on the second aggregated data. For example, the controller platform may utilize the data identifying the sets of network devices to generate graphical representations (e.g., icons) of the sites, and may utilize the network data identifying the links interconnecting the identified sets of network devices to generate graphical representations (e.g., lines) of the links.

As shown in FIG. 1N, and by reference number 170, the controller platform may receive (e.g., from the client device) a user interface indication that indicates an interaction with the site layer user interface provided to the client device. For example, the interaction may include the user requesting that a regional layer user interface for the potential network plan be provided.

As further shown in FIG. 1N, and by reference number 175, based on the indication, the controller platform may aggregate and optimize the second aggregated data to generate third aggregated data used to generate the regional layer user interface. In some implementations, the third aggregated data may include the data identifying sets or groups of sites associated with the potential network plan and the links interconnecting the identified sets of sites. In some implementations, the controller platform may generate the regional layer user interface based on the third aggregated data. For example, the controller platform may utilize the data identifying the sets of sites to generate graphical representations (e.g., icons) of the regions, and may utilize the network data identifying the links interconnecting the identified sets of sites to generate graphical representations (e.g., lines) of the links.

In some implementations, when the regional layer user interface is provided to the client device, the controller platform may receive, from the client device, information indicating that the user wishes to return to the site layer user interface. In such implementations, the controller platform may utilize the second aggregated data to regenerate the site layer user interface and to provide the site layer user interface to the client device in near-real time.

In some implementations, when the site layer user interface is provided to the client device, the controller platform may receive, from the client device, information indicating that the user wishes to return to the device layer user interface. In such implementations, the controller platform may utilize the first aggregated data to regenerate the device layer user interface and to provide the device layer user interface to the client device in near-real time.

In some implementations, the controller platform may utilize the aggregated data described above to provision the network, implement routing in the network, implement the network plan in the network, and/or the like.

In this way, the controller platform may provide interactive user interfaces that provide a clear understanding of a network plan and prevent implementation of sub-optimal network plans. This, in turn, conserves computing resources (e.g., processing resources, memory resources, and/or the like), networking resources, and/or the like that would otherwise be wasted in identifying a sub-optimal network plan, correcting inefficient network operation caused by the sub-optimal network plan, correcting inefficient utilization of network resources caused by the sub-optimal network plan, and/or the like. Furthermore, implementations described herein use a rigorous, computerized process to perform tasks that were not previously performed. For example, currently there does not exist a technique that provides interactive user interfaces for displaying features of an optimized network plan.

As indicated above, FIGS. 1A-1N are provided merely as examples. Other examples may differ from what is described with regard to FIGS. 1A-1N.

Figure 2:
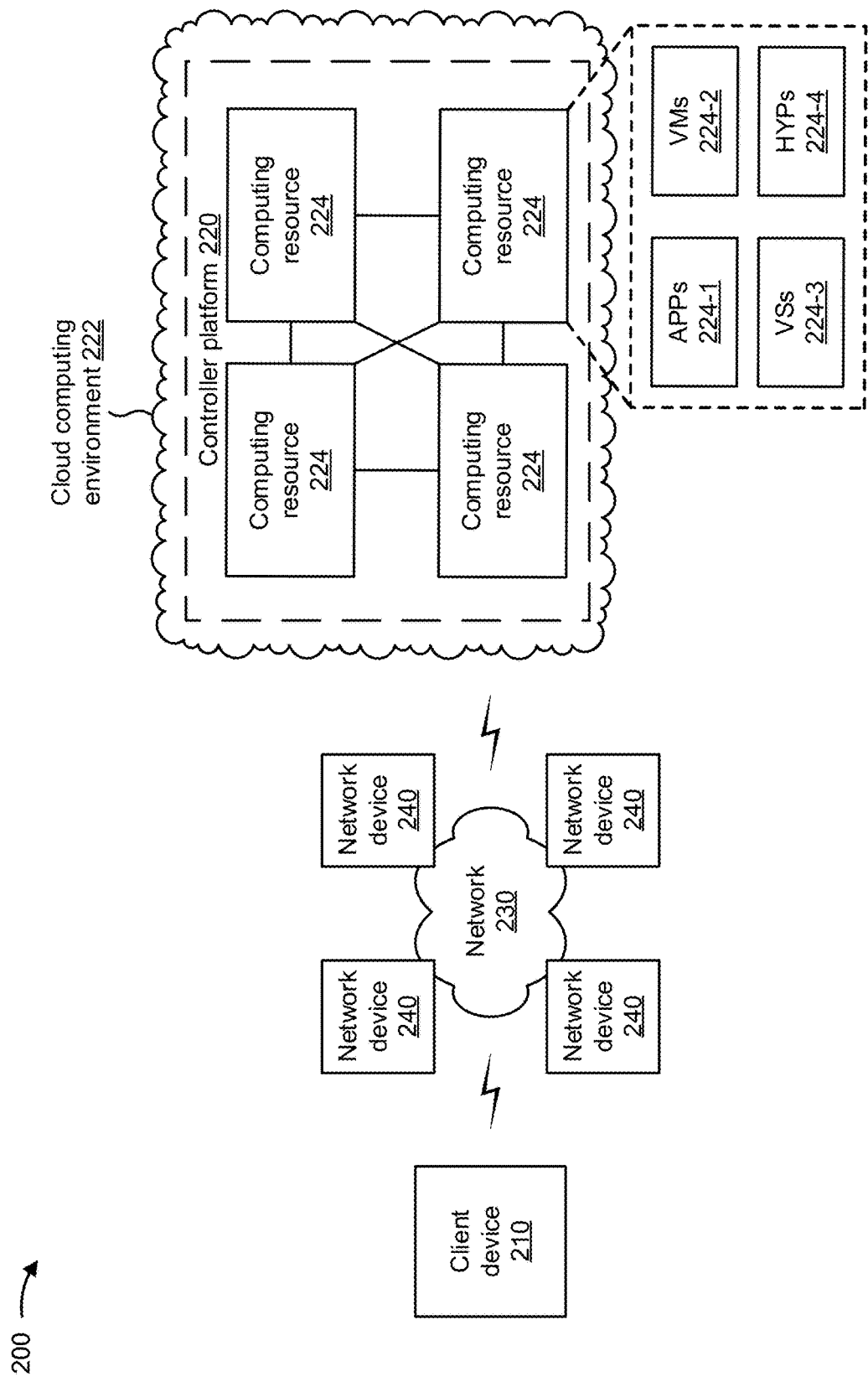
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, a controller platform 220, a network 230, and a group of network devices 240 of network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to controller platform 220, via network 230 and network devices 240. In some implementations, client device 210 may receive network traffic from and/or may provide network traffic to other client devices 210 via network 230 (e.g., by routing packets using network devices 240 as intermediaries).

Controller platform 220 includes one or more devices that provide interactive user interfaces for displaying features of an optimized network plan. In some implementations, controller platform 220 may be designed to be modular such that certain software components may be swapped in or out depending on a particular need. As such, controller platform 220 may be easily and/or quickly reconfigured for different uses. In some implementations, controller platform 220 may receive information from and/or transmit information to one or more client devices 210 and/or network devices 240.

In some implementations, as shown, controller platform 220 may be hosted in a cloud computing environment 222. Notably, while implementations described herein describe controller platform 220 as being hosted in cloud computing environment 222, in some implementations, controller platform 220 may not be cloud-based (i.e., may be implemented outside of a cloud computing environment) or may be partially cloud-based.

Cloud computing environment 222 includes an environment that hosts controller platform 220. Cloud computing environment 222 may provide computation, software, data access, storage, and/or the like, services that do not require end-user knowledge of a physical location and configuration of system(s) and/or device(s) that hosts controller platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host controller platform 220. The cloud resources may include compute instances executing in computing resource 224, storage devices provided in computing resource 224, data transfer devices provided by computing resource 224, and/or the like. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210 and/or network devices 240. For example, application 224-1 may include software associated with controller platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of controller platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 240 includes one or more devices capable of receiving, processing, storing, routing, and/or providing traffic (e.g., a packet, other information or metadata, and/or the like) in a manner described herein. For example, network device 240 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 240 may include a gateway, a switch, a firewall, a hub, a bridge, a reverse proxy, a server (e.g., a proxy server, a cloud server, a data center server, and/or the like), a load balancer, and/or a similar device. In some implementations, network device 240 may be a physical device implemented within a housing, such as a chassis. In some implementations, network device 240 may be a virtual device implemented by one or more computer devices of a cloud computing environment or a data center. In some implementations, a group of network devices 240 may be a group of data center nodes that are used to route traffic flow through network 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
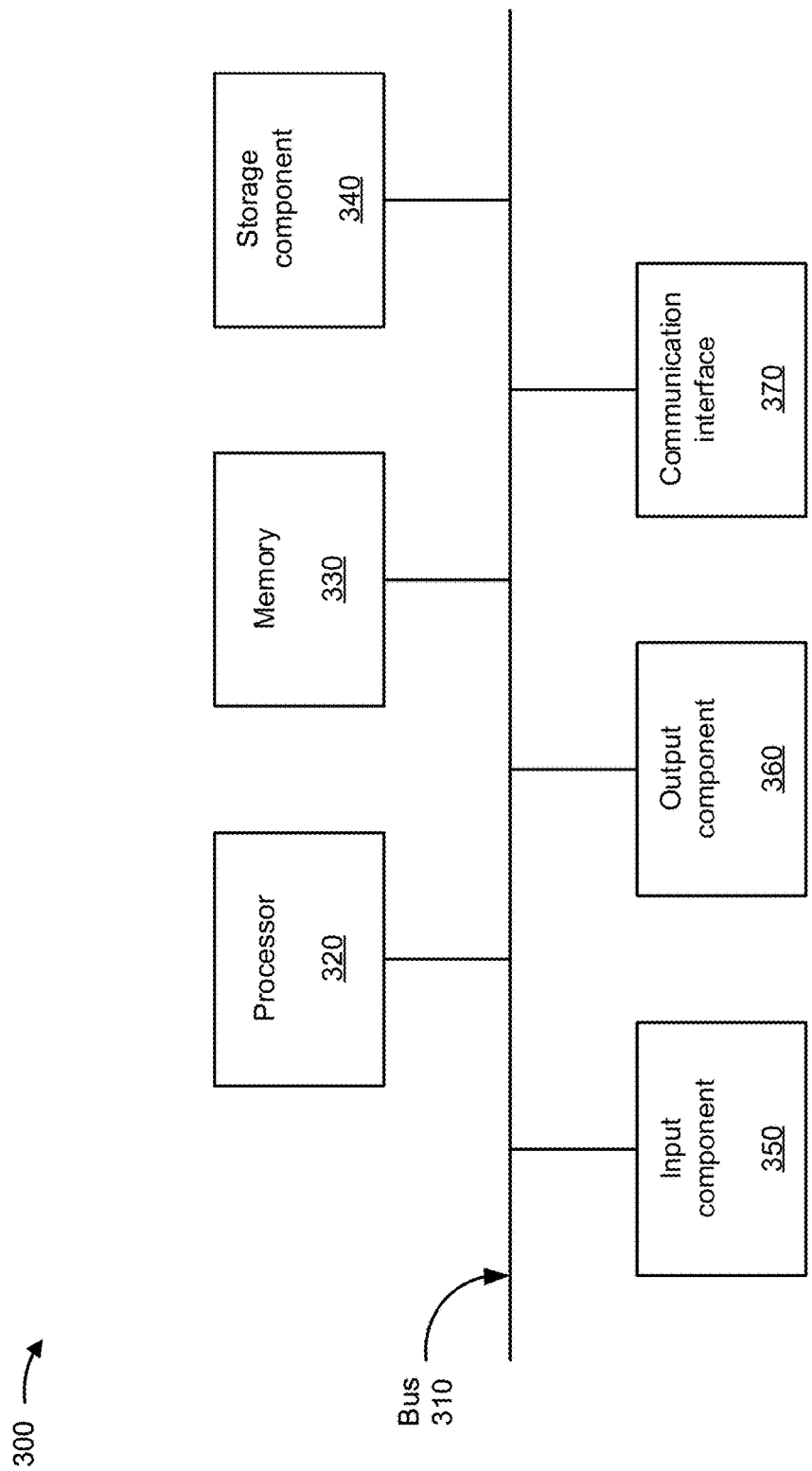
FIG. 3 is a diagram of example components of one or more devices of FIG. 2.

FIG. 3 is a diagram of example components of a device 300. Device 300 may correspond to client device 210, controller platform 220, computing resource 224, and/or network device 240. In some implementations, client device 210, controller platform 220, computing resource 224, and/or network device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
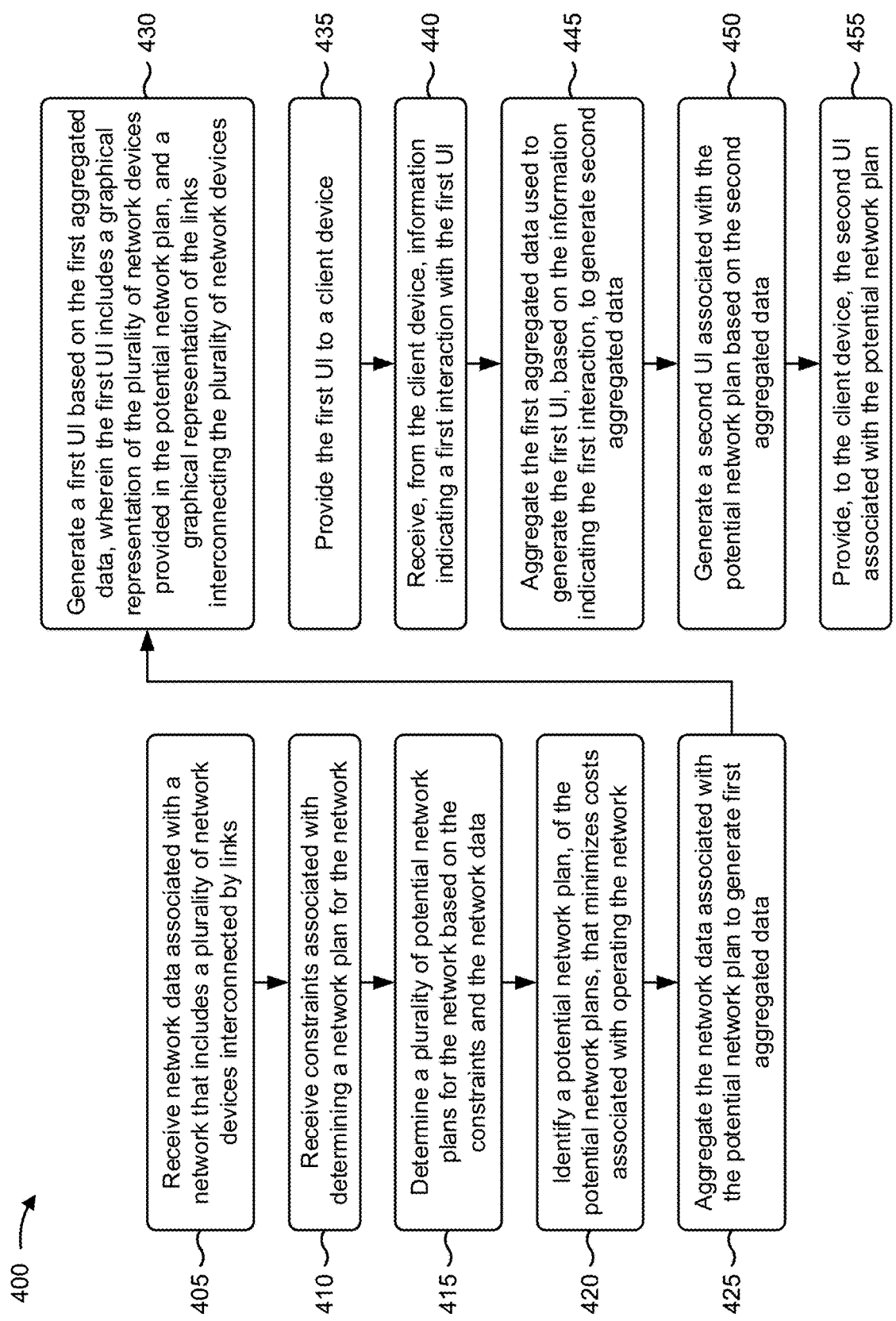
FIGS. 4-6 are flow charts of example processes for providing interactive user interfaces for displaying features of an optimized network plan.

FIG. 4 is a flow chart of an example process 400 for providing interactive user interfaces for displaying features of an optimized network plan. In some implementations, one or more process blocks of FIG. 4 may be performed by a controller platform (e.g., controller platform 220). In some implementations, one or more process blocks of FIG. 4 may be performed by another device or a group of devices separate from or including the controller platform, such as a client device (e.g., client device 210) and/or a network device (e.g., network device 240).

As shown in FIG. 4, process 400 may include receiving network data associated with a network, wherein the network includes a plurality of network devices interconnected by links (block 405). For example, the controller platform (e.g., using computing resource 224, processor 320, communication interface 370, and/or the like) may receive network data associated with a network, as described above in connection with FIGS. 1A-3. In some aspects, the network may include a plurality of network devices interconnected by links.

As further shown in FIG. 4, process 400 may include receiving constraints associated with determining a network plan for the network (block 410). For example, the controller platform (e.g., using computing resource 224, processor 320, communication interface 370, and/or the like) may receive constraints associated with determining a network plan for the network, as described above in connection with FIGS. 1A-3.

As further shown in FIG. 4, process 400 may include determining a plurality of potential network plans for the network based on the constraints and the network data (block 415). For example, the controller platform (e.g., using computing resource 224, processor 320, memory 330, and/or the like) may determine a plurality of potential network plans for the network based on the constraints and the network data, as described above in connection with FIGS. 1A-3.

As further shown in FIG. 4, process 400 may include identifying a potential network plan, of the plurality of potential network plans, that minimizes costs associated with operating the network (block 420). For example, the controller platform (e.g., using computing resource 224, processor 320, storage component 340, and/or the like) may identify a potential network plan, of the plurality of potential network plans, that minimizes costs associated with operating the network, as described above in connection with FIGS. 1A-3.

As further shown in FIG. 4, process 400 may include aggregating the network data associated with the potential network plan to generate first aggregated data (block 425). For example, the controller platform (e.g., using computing resource 224, processor 320, memory 330, and/or the like) may aggregate the network data associated with the potential network plan to generate first aggregated data, as described above in connection with FIGS. 1A-3.

As further shown in FIG. 4, process 400 may include generating a first user interface associated with the potential network plan based on the first aggregated data, wherein the first user interface includes a graphical representation of the plurality of network devices provided in the potential network plan, and a graphical representation of the links interconnecting the plurality of network devices provided in the potential network plan (block 430). For example, the controller platform (e.g., using computing resource 224, processor 320, storage component 340, and/or the like) may generate a first user interface associated with the potential network plan based on the first aggregated data, as described above in connection with FIGS. 1A-3. In some aspects, the first user interface may include a graphical representation of the plurality of network devices provided in the potential network plan and a graphical representation of the links interconnecting the plurality of network devices provided in the potential network plan.

As further shown in FIG. 4, process 400 may include providing the first user interface to a client device (block 435). For example, the controller platform (e.g., using computing resource 224, processor 320, communication interface 370, and/or the like) may provide the first user interface to a client device, as described above in connection with FIGS. 1A-3.

As further shown in FIG. 4, process 400 may include receiving, from the client device, information indicating a first interaction with the first user interface (block 440). For example, the controller platform (e.g., using computing resource 224, processor 320, communication interface 370, and/or the like) may receive, from the client device, information indicating a first interaction with the first user interface, as described above in connection with FIGS. 1A-3.

As further shown in FIG. 4, process 400 may include aggregating the first aggregated data used to generate the first user interface, based on the information indicating the first interaction, to generate second aggregated data (block 445). For example, the controller platform (e.g., using computing resource 224, processor 320, memory 330, and/or the like) may aggregate the first aggregated data used to generate the first user interface, based on the information indicating the first interaction, to generate second aggregated data, as described above in connection with FIGS. 1A-3.

As further shown in FIG. 4, process 400 may include generating a second user interface associated with the potential network plan based on the second aggregated data (block 450). For example, the controller platform (e.g., using computing resource 224, processor 320, storage component 340, and/or the like) may generate a second user interface associated with the potential network plan based on the second aggregated data, as described above in connection with FIGS. 1A-3.

As further shown in FIG. 4, process 400 may include providing, to the client device, the second user interface associated with the potential network plan (block 455). For example, the controller platform (e.g., using computing resource 224, processor 320, communication interface 370, and/or the like) may provide, to the client device, the second user interface associated with the potential network plan, as described above in connection with FIGS. 1A-3.

Process 400 may include additional implementations, such as any single implementation or any combination of implementations described below and/or in connection with one or more other processes described elsewhere herein.

In some implementations, the second user interface may include a graphical representation of a plurality of sites provided in the potential network plan, where each site may represent a set of the plurality of network devices, and a graphical representation of links interconnecting the plurality of sites provided in the potential network plan.

In some implementations, the controller platform may receive, from the client device, information indicating a second interaction with the second user interface; may aggregate the second aggregated data used to generate the second user interface, based on the information indicating the second interaction, to generate third aggregated data; may generate a third user interface associated with the potential network plan based on the third aggregated data; and may provide, to the client device, the third user interface associated with the potential network plan.

In some implementations, the third user interface may include a graphical representation of a plurality of regions provided in the potential network plan, where each region may represent a set of the plurality of sites, and a graphical representation of links interconnecting the plurality of regions provided in the potential network plan.

In some implementations, the controller platform may receive, from the client device, information indicating a third interaction with the third user interface; may utilize the second aggregated data, based on the information indicating the third interaction, to regenerate the second user interface; and may provide the second user interface to the client device.

In some implementations, the controller platform may receive, from the client device, information indicating a fourth interaction with the second user interface; may utilize the first aggregated data, based on the information indicating the fourth interaction, to regenerate the first user interface; and may provide the first user interface to the client device.

In some implementations, the controller platform may receive, from the client device and via the first user interface or the second user interface, an input indicating that the potential network plan is to be implemented in the network, and may cause, based on the input, the potential network plan to be implemented in the network by the plurality of network devices.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
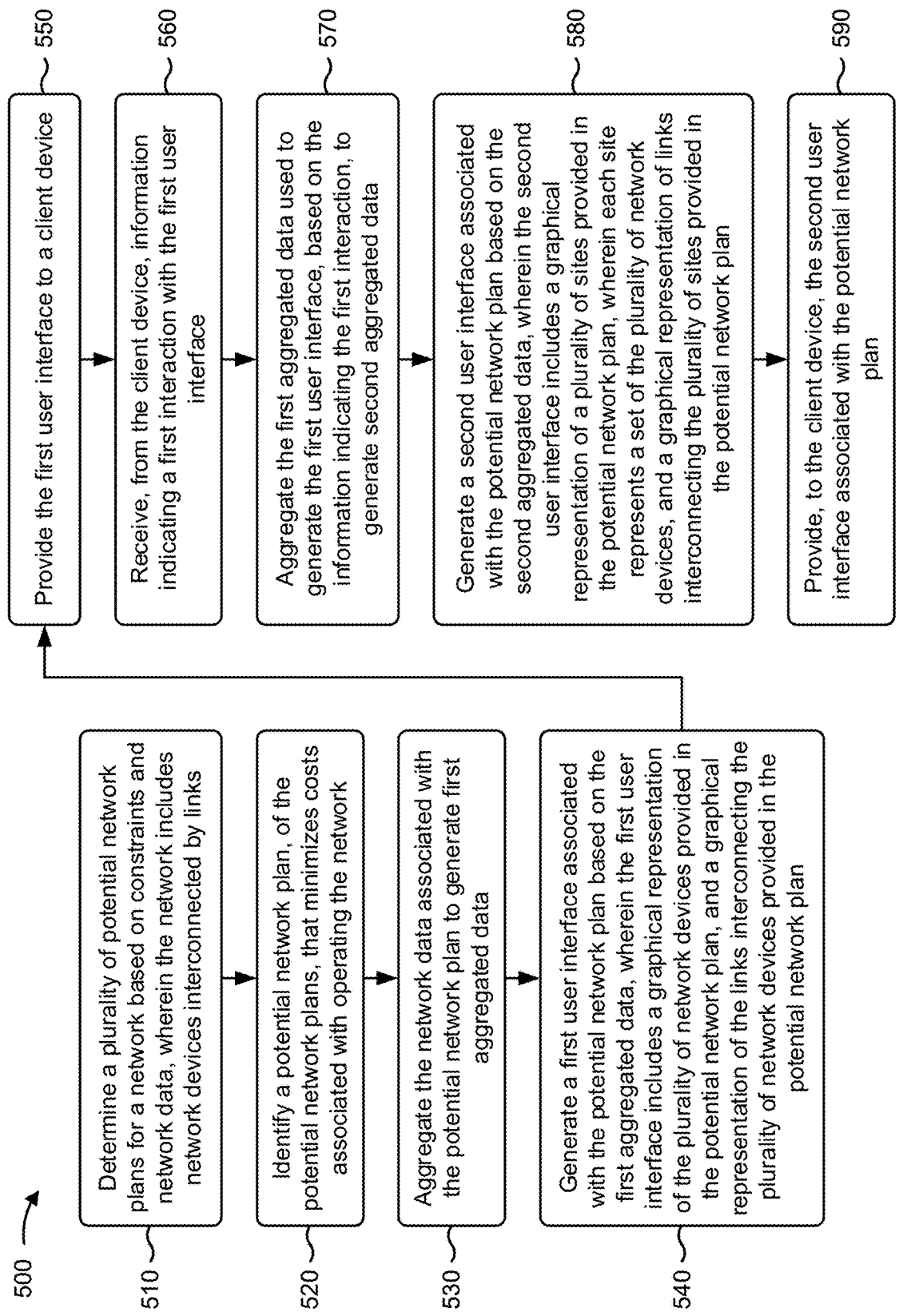

FIG. 5 is a flow chart of an example process 500 for providing interactive user interfaces for displaying features of an optimized network plan. In some implementations, one or more process blocks of FIG. 5 may be performed by a controller platform (e.g., controller platform 220). In some implementations, one or more process blocks of FIG. 5 may be performed by another device or a group of devices separate from or including the controller platform, such as a client device (e.g., client device 210) and/or a network device (e.g., network device 240).

As shown in FIG. 5, process 500 may include determining a plurality of potential network plans for a network based on constraints and network data, wherein the network includes a plurality of network devices interconnected by links (block 510). For example, the controller platform (e.g., using computing resource 224, processor 320, memory 330, communication interface 370, and/or the like) may determine a plurality of potential network plans for a network based on constraints and network data, as described above in connection with FIGS. 1A-3. In some aspects, the network may include a plurality of network devices interconnected by links.

As further shown in FIG. 5, process 500 may include identifying a potential network plan, of the plurality of potential network plans, that minimizes costs associated with operating the network (block 520). For example, the controller platform (e.g., using computing resource 224, processor 320, storage component 340, and/or the like) may identify a potential network plan, of the plurality of potential network plans, that minimizes costs associated with operating the network, as described above in connection with FIGS. 1A-3.

As further shown in FIG. 5, process 500 may include aggregating the network data associated with the potential network plan to generate first aggregated data (block 530). For example, the controller platform (e.g., using computing resource 224, processor 320, memory 330, and/or the like) may aggregate the network data associated with the potential network plan to generate first aggregated data, as described above in connection with FIGS. 1A-3.

As further shown in FIG. 5, process 500 may include generating a first user interface associated with the potential network plan based on the first aggregated data, wherein the first user interface includes a graphical representation of the plurality of network devices provided in the potential network plan, and a graphical representation of the links interconnecting the plurality of network devices provided in the potential network plan (block 540). For example, the controller platform (e.g., using computing resource 224, processor 320, storage component 340, and/or the like) may generate a first user interface associated with the potential network plan based on the first aggregated data, as described above in connection with FIGS. 1A-3. In some aspects, the first user interface may include a graphical representation of the plurality of network devices provided in the potential network plan and a graphical representation of the links interconnecting the plurality of network devices provided in the potential network plan.

As further shown in FIG. 5, process 500 may include providing the first user interface to a client device (block 550). For example, the controller platform (e.g., using computing resource 224, processor 320, communication interface 370, and/or the like) may provide the first user interface to a client device, as described above in connection with FIGS. 1A-3.

As further shown in FIG. 5, process 500 may include receiving, from the client device, information indicating a first interaction with the first user interface (block 560). For example, the controller platform (e.g., using computing resource 224, processor 320, communication interface 370, and/or the like) may receive, from the client device, information indicating a first interaction with the first user interface, as described above in connection with FIGS. 1A-3.

As further shown in FIG. 5, process 500 may include aggregating the first aggregated data used to generate the first user interface, based on the information indicating the first interaction, to generate second aggregated data (block 570). For example, the controller platform (e.g., using computing resource 224, processor 320, memory 330, and/or the like) may aggregate the first aggregated data used to generate the first user interface, based on the information indicating the first interaction, to generate second aggregated data, as described above in connection with FIGS. 1A-3.

As further shown in FIG. 5, process 500 may include generating a second user interface associated with the potential network plan based on the second aggregated data, wherein the second user interface includes a graphical representation of a plurality of sites provided in the potential network plan, wherein each site represents a set of the plurality of network devices, and includes a graphical representation of links interconnecting the plurality of sites provided in the potential network plan (block 580). For example, the controller platform (e.g., using computing resource 224, processor 320, storage component 340, and/or the like) may generate a second user interface associated with the potential network plan based on the second aggregated data, as described above in connection with FIGS. 1A-3. In some aspects, the second user interface may include a graphical representation of a plurality of sites provided in the potential network plan, where each site may represent a set of the plurality of network devices, and include a graphical representation of links interconnecting the plurality of sites provided in the potential network plan.

As further shown in FIG. 5, process 500 may include providing, to the client device, the second user interface associated with the potential network plan (block 590). For example, the controller platform (e.g., using computing resource 224, processor 320, communication interface 370, and/or the like) may provide, to the client device, the second user interface associated with the potential network plan, as described above in connection with FIGS. 1A-3.

Process 500 may include additional implementations, such as any single implementation or any combination of implementations described below and/or in connection with one or more other processes described elsewhere herein.

In some implementations, the controller platform may receive, from the client device, information indicating a second interaction with the second user interface, may utilize the first aggregated data, based on the information indicating the second interaction, to regenerate the first user interface, and may provide the first user interface to the client device.

In some implementations, when aggregating the first aggregated data used to generate the first user interface, the controller platform may process, based on the constraints, the first aggregated data to generate data associated with sets of the plurality of network devices, where each set of the plurality of network devices may represent one of the plurality of sites, and may generate the second user interface based on data associated with the plurality of sites.

In some implementations, the controller platform may determine a plurality of costs associated with the plurality of potential network plans based on the network data, and the first user interface may include information identifying the plurality of costs associated with the plurality of potential network plans.

In some implementations, the controller platform may receive, from the client device and via the second user interface, a selection of a particular link provided between two of the plurality of sites, may generate information associated with the particular link based on the selection of the particular link, and may provide, to the client device and via the second user interface, the information associated with the particular link.

In some implementations, when identifying the potential network plan, the controller platform may determine a plurality of costs associated with the plurality of potential network plans based on the network data, may identify the potential network plan that minimizes the costs associated with operating the network based on the plurality of costs associated with the plurality of potential network plans, and may provide, to the client device and via the first user interface, information identifying a cost associated with the potential network plan.

In some implementations, the first user interface may include information that permits a user of the client device to modify one or more portions of the potential network plan.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
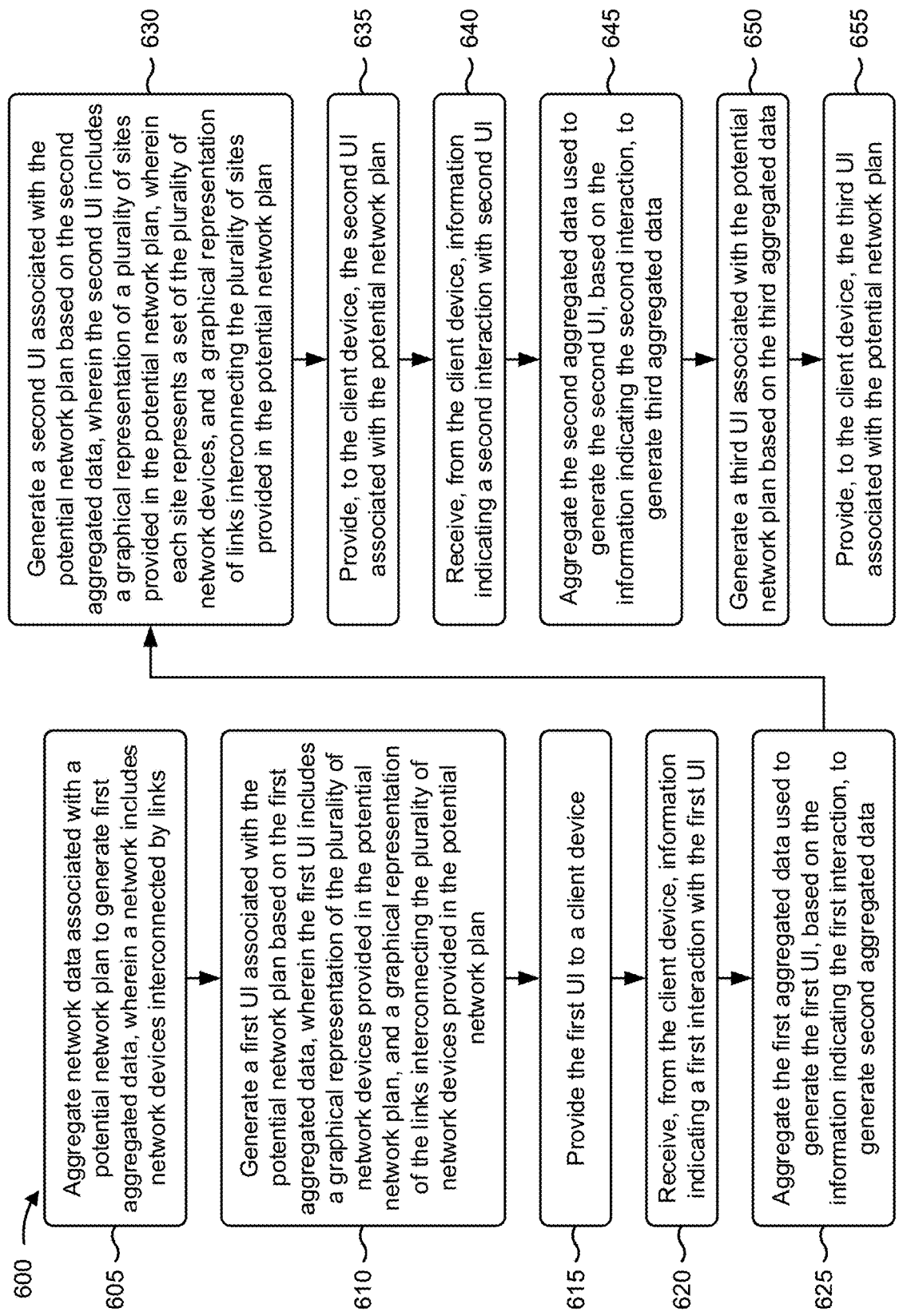

FIG. 6 is a flow chart of an example process 600 for providing interactive user interfaces for displaying features of an optimized network plan. In some implementations, one or more process blocks of FIG. 6 may be performed by a controller platform (e.g., controller platform 220). In some implementations, one or more process blocks of FIG. 6 may be performed by another device or a group of devices separate from or including the controller platform, such as a client device (e.g., client device 210) and/or a network device (e.g., network device 240).

As shown in FIG. 6, process 600 may include aggregating network data associated with a potential network plan to generate first aggregated data, wherein the potential network plan is determined, based on the network data, for a network that includes a plurality of network devices interconnected by links (block 605). For example, the controller platform (e.g., using computing resource 224, processor 320, memory 330, and/or the like) may aggregate network data associated with a potential network plan to generate first aggregated data, as described above in connection with FIGS. 1A-3. In some aspects, the potential network plan may be determined, based on the network data, for a network that includes a plurality of network devices interconnected by links.

As further shown in FIG. 6, process 600 may include generating a first user interface associated with the potential network plan based on the first aggregated data, wherein the first user interface includes a graphical representation of the plurality of network devices provided in the potential network plan, and a graphical representation of the links interconnecting the plurality of network devices provided in the potential network plan (block 610). For example, the controller platform (e.g., using computing resource 224, processor 320, storage component 340, and/or the like) may generate a first user interface associated with the potential network plan based on the first aggregated data, as described above in connection with FIGS. 1A-3. In some aspects, the first user interface may include a graphical representation of the plurality of network devices provided in the potential network plan and a graphical representation of the links interconnecting the plurality of network devices provided in the potential network plan.

As further shown in FIG. 6, process 600 may include providing the first user interface to a client device (block 615). For example, the controller platform (e.g., using computing resource 224, processor 320, communication interface 370, and/or the like) may provide the first user interface to a client device, as described above in connection with FIGS. 1A-3.

As further shown in FIG. 6, process 600 may include receiving, from the client device, information indicating a first interaction with the first user interface (block 620). For example, the controller platform (e.g., using computing resource 224, processor 320, communication interface 370, and/or the like) may receive, from the client device, information indicating a first interaction with the first user interface, as described above in connection with FIGS. 1A-3.

As further shown in FIG. 6, process 600 may include aggregating the first aggregated data used to generate the first user interface, based on the information indicating the first interaction, to generate second aggregated data (block 625). For example, the controller platform (e.g., using computing resource 224, processor 320, memory 330, and/or the like) may aggregate the first aggregated data used to generate the first user interface, based on the information indicating the first interaction, to generate second aggregated data, as described above in connection with FIGS. 1A-3.

As further shown in FIG. 6, process 600 may include generating a second user interface associated with the potential network plan based on the second aggregated data, wherein the second user interface includes a graphical representation of a plurality of sites provided in the potential network plan, wherein each site represents a set of the plurality of network devices, and includes a graphical representation of links interconnecting the plurality of sites provided in the potential network plan (block 630). For example, the controller platform (e.g., using computing resource 224, processor 320, storage component 340, and/or the like) may generate a second user interface associated with the potential network plan based on the second aggregated data, as described above in connection with FIGS. 1A-3. In some aspects, the second user interface includes. In some aspects, the second user interface may include, a graphical representation of a plurality of sites provided in the potential network plan, where each site may represent a set of the plurality of network devices, and includes a graphical representation of links interconnecting the plurality of sites provided in the potential network plan.

As further shown in FIG. 6, process 600 may include providing, to the client device, the second user interface associated with the potential network plan (block 635). For example, the controller platform (e.g., using computing resource 224, processor 320, communication interface 370, and/or the like) may provide, to the client device, the second user interface associated with the potential network plan, as described above in connection with FIGS. 1A-3.

As further shown in FIG. 6, process 600 may include receiving, from the client device, information indicating a second interaction with the second user interface (block 640). For example, the controller platform (e.g., using computing resource 224, processor 320, communication interface 370, and/or the like) may receive, from the client device, information indicating a second interaction with the second user interface, as described above in connection with FIGS. 1A-3.

As further shown in FIG. 6, process 600 may include aggregating the second aggregated data used to generate the second user interface, based on the information indicating the second interaction, to generate third aggregated data (block 645). For example, the controller platform (e.g., using computing resource 224, processor 320, memory 330, and/or the like) may aggregate the second aggregated data used to generate the second user interface, based on the information indicating the second interaction, to generate third aggregated data, as described above in connection with FIGS. 1A-3.

As further shown in FIG. 6, process 600 may include generating a third user interface associated with the potential network plan based on the third aggregated data (block 650). For example, the controller platform (e.g., using computing resource 224, processor 320, storage component 340, and/or the like) may generate a third user interface associated with the potential network plan based on the third aggregated data, as described above in connection with FIGS. 1A-3.

As further shown in FIG. 6, process 600 may include providing, to the client device, the third user interface associated with the potential network plan (block 655). For example, the controller platform (e.g., using computing resource 224, processor 320, communication interface 370, and/or the like) may provide, to the client device, the third user interface associated with the potential network plan, as described above in connection with FIGS. 1A-3.

Process 600 may include additional implementations, such as any single implementation or any combination of implementations described below and/or in connection with one or more other processes described elsewhere herein.

In some implementations, the third user interface may include a graphical representation of a plurality of regions provided in the potential network plan, where each region may represent a set of the plurality of sites, and a graphical representation of links interconnecting the plurality of regions provided in the potential network plan.

In some implementations, the controller platform may receive, from the client device, information indicating a third interaction with the third user interface, may utilize the second aggregated data, based on the information indicating the third interaction, to regenerate the second user interface, and may provide the second user interface to the client device.

In some implementations, the controller platform may receive, from the client device, information indicating a fourth interaction with the second user interface, may utilize the first aggregated data, based on the information indicating the fourth interaction, to regenerate the first user interface, and may provide the first user interface to the client device.

In some implementations, the controller platform may receive, from the client device and via the first user interface, the second user interface, or the third user interface, an input indicating that the potential network plan is to be implemented in the network, and may cause, based on the input, the potential network plan to be implemented in the network by the plurality of network devices. In some implementations, the first user interface, the second user interface, and the third user interface may be provided to the client device in near-real time.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, and/or the like). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, first network data associated with a network, wherein the network includes a plurality of network devices interconnected by first links;
receiving, by the device, constraints associated with determining a potential network plan for the network;
determining, by the device, a plurality of potential network plans, including the potential network plan, for the network based on the constraints and the first network data,
　wherein the plurality of potential network plans are determined within a particular time period specified by a constraint of the constraints,
　wherein a quantity of the plurality of potential network plans determined is based on the particular time period,
　wherein a resource usage, associated with the device determining the plurality of potential network plans, is determined based on the particular time period,
　wherein determining the plurality of potential network plans comprises:
　　determining first candidate links for inter-gateway links and inter-metro links for the plurality of potential network plans;
　　determining second candidate links for hub links for the plurality of potential network plans;
　　determining candidate paths for the plurality of potential network plans; and
　　determining, based on the first candidate links, based on the second candidate links, and based on the candidate paths, a cost associated with the plurality of potential network plans;
identifying, by the device and based on the cost associated with the plurality of potential network plans, the potential network plan, of the plurality of potential network plans, that reduces a cost associated with operating the network as compared to a current cost of operating the network,
　wherein the potential network plan is associated with a lowest quantity of traffic demand failures among the plurality of potential network plans;
aggregating, by the device, second network data associated with the potential network plan to generate first aggregated data;
generating, by the device, a first user interface associated with the potential network plan based on the first aggregated data,
　wherein the first user interface includes:
　　a graphical representation of the plurality of network devices
　　provided in the potential network plan, and
　　a graphical representation of second links interconnecting the
　　plurality of network devices provided in the potential network plan;
providing, by the device, the first user interface to a client device;
receiving, by the device and from the client device, information indicating a first interaction with the first user interface;
aggregating, by the device and based on the information indicating the first interaction, the first aggregated data used to generate the first user interface to generate second aggregated data;
generating, by the device, a second user interface associated with the potential network plan based on the second aggregated data; and providing, by the device and to the client device, the second user interface associated with the potential network plan.

2. The method of claim 1, wherein the second user interface includes:
　a graphical representation of a plurality of sites provided in the potential network plan,
　　wherein each site represents a set of the plurality of network devices, and
　a graphical representation of third links interconnecting the plurality of sites provided in the potential network plan.

3. The method of claim 2, further comprising:
receiving, from the client device, information indicating a second interaction with the second user interface;
aggregating the second aggregated data used to generate the second user interface, based on the information indicating the second interaction, to generate third aggregated data;
generating a third user interface associated with the potential network plan based on the third aggregated data; and
providing, to the client device, the third user interface associated with the potential network plan.

4. The method of claim 3, wherein the third user interface includes:
　a graphical representation of a plurality of regions provided in the potential network plan,
　　wherein each region represents a set of the plurality of sites, and
　a graphical representation of fourth links interconnecting the plurality of regions provided in the potential network plan.

5. The method of claim 3, further comprising:
receiving, from the client device, information indicating a third interaction with the third user interface;
utilizing the second aggregated data, based on the information indicating the third interaction, to regenerate the second user interface; and
providing the second user interface to the client device.

6. The method of claim 5, further comprising:
receiving, from the client device, information indicating a fourth interaction with the second user interface;
utilizing the first aggregated data, based on the information indicating the fourth interaction, to regenerate the first user interface; and
providing the first user interface to the client device.

7. The method of claim 1, further comprising:
receiving, from the client device and via the first user interface or the second user interface, an input indicating that the potential network plan is to be implemented in the network; and
causing, based on the input, the potential network plan to be implemented in the network by the plurality of network devices.

8. The method of claim 1, further comprising:
generating the plurality of potential network plans based on the particular time period.

9. A device, comprising:
one or more memories; and
one or more processors, communicatively coupled to the one or more memories, to:
　determine a plurality of potential network plans for a network based on constraints and first network data,
　　wherein the plurality of potential network plans are determined within a particular time period specified by a constraint of the constraints, wherein a quantity of the plurality of potential network plans determined is based on the particular time period,
wherein a resource usage, associated with the device determining the plurality of potential network plans, is determined based on the particular time period,
wherein the network includes a plurality of network devices interconnected by first links, and
wherein determining the plurality of potential network plans comprises:
  determining first candidate links for inter-gateway links and inter-metro links for the plurality of potential network plans;
  determining second candidate links for hub links for the plurality of potential network plans;
  determining candidate paths for the plurality of potential network plans; and
  determining, based on the first candidate links, based on the second candidate links, and based on the candidate paths, a cost associated with the plurality of potential network plans;
identify, based on the cost associated with the plurality of potential network plans, a potential network plan, of the plurality of potential network plans, that reduces a cost associated with operating the network as compared to a current cost of operating the network,
wherein the potential network plan is associated with a lowest quantity of traffic demand failures among the plurality of potential network plans;
aggregate second network data associated with the potential network plan to generate first aggregated data;
generate a first user interface associated with the potential network plan based on the first aggregated data,
wherein the first user interface includes:
  a graphical representation of the plurality of network devices provided in the potential network plan, and
  a graphical representation of second links interconnecting the plurality of network devices provided in the potential network plan;
provide the first user interface to a client device;
receive, from the client device, information indicating a first interaction with the first user interface;
aggregate, based on the information indicating the first interaction, the first aggregated data used to generate the first user interface to generate second aggregated data;
generate a second user interface associated with the potential network plan based on the second aggregated data,
wherein the second user interface includes:
  a graphical representation of a plurality of sites provided in the potential network plan,
    wherein each site represents a set of the plurality of network devices, and
  a graphical representation of third links interconnecting the plurality of sites provided in the potential network plan; and
provide, to the client device, the second user interface associated with the potential network plan.

10. The device of claim 9, wherein the one or more processors are further to:
receive, from the client device, information indicating a second interaction with the second user interface;
utilize the first aggregated data, based on the information indicating the second interaction, to regenerate the first user interface; and
provide the first user interface to the client device.

11. The device of claim 9, wherein the one or more processors, when aggregating the first aggregated data used to generate the first user interface, are to:
process, based on the constraints, the first aggregated data to generate data associated with sets of the plurality of network devices,
  wherein each set of the plurality of network devices is to represent one of the plurality of sites; and
generate the second user interface based on data associated with the plurality of sites.

12. The device of claim 9, wherein the one or more processors are further to:
determine a plurality of costs associated with the plurality of potential network plans based on the first network data,
  wherein the first user interface includes information identifying the plurality of costs associated with the plurality of potential network plans.

13. The device of claim 9, wherein the one or more processors are further to:
receive, from the client device and via the second user interface, a selection of a particular link provided between two of the plurality of sites;
generate information associated with the particular link based on the selection of the particular link; and
provide, to the client device and via the second user interface, the information associated with the particular link.

14. The device of claim 9, wherein the one or more processors, when identifying the potential network plan, are to:
determine a plurality of costs associated with the plurality of potential network plans based on the first network data; and
identify the potential network plan that reduces the cost associated with operating the network based on the plurality of costs associated with the plurality of potential network plans; and
wherein the one or more processors, when providing the first user interface to the client device, are to:
provide, to the client device and via the first user interface, information identifying a cost associated with the potential network plan.

15. The device of claim 9, wherein the first user interface includes:
information that permits a user of the client device to modify one or more portions of the potential network plan.

16. The device of claim 9, wherein the one or more processors are further to:
generate the plurality of potential network plans based on the particular time period.

17. A non-transitory computer-readable medium storing instructions, the instructions comprising:
one or more instructions that, when executed by one or more processors, cause the one or more processors to:
  determine a plurality of potential network plans for a network based on constraints associated with determining a potential network plan, of the plurality of potential network plans, for the network and first network data associated with the network,
    wherein the network includes a plurality of network devices interconnected by first links, wherein the plurality of potential network plans are
determined within a particular time period specified by a constraint of the constraints,
wherein a quantity of the plurality of potential network plans determined is based on the particular time period,
wherein a resource usage, associated with a device determining the plurality of potential network plans, is determined based on the particular time period, and
wherein determining the plurality of potential network plans comprises:
determining first candidate links for inter-gateway links and inter-metro links for the plurality of potential network plans;
determining second candidate links for hub links for the plurality of potential network plans;
determining candidate paths for the plurality of potential network plans; and
determining, based on the first candidate links, based on the second candidate links, and based on the candidate paths, a cost associated with the plurality of potential network plans;
identify, based on the cost associated with the plurality of potential network plans, the potential network plan, of the plurality of potential network plans, that reduces a cost associated with operating the network as compared to a current cost of operating the network,
wherein the potential network plan is associated with a lowest quantity of traffic demand failures among the plurality of potential network plans;
aggregate second network data associated with the potential network plan to generate first aggregated data;
generate a first user interface associated with the potential network plan based on the first aggregated data,
wherein the first user interface includes:
a graphical representation of the plurality of network devices provided in the potential network plan, and
a graphical representation of second links interconnecting the plurality of network devices provided in the potential network plan;
provide the first user interface to a client device;
receive, from the client device, information indicating a first interaction with the first user interface;
aggregate, based on the information indicating the first interaction, the first aggregated data used to generate the first user interface to generate second aggregated data;
generate a second user interface associated with the potential network plan based on the second aggregated data,
wherein the second user interface includes:
a graphical representation of a plurality of sites provided in the potential network plan,
wherein each site represents a set of the plurality of network devices, and
a graphical representation of third links interconnecting the plurality of sites provided in the potential network plan;
provide, to the client device, the second user interface associated with the potential network plan;
receive, from the client device, information indicating a second interaction with the second user interface;
aggregate, based on the information indicating the second interaction, the second aggregated data used to generate the second user interface to generate third aggregated data;
generate a third user interface associated with the potential network plan based on the third aggregated data; and
provide, to the client device, the third user interface associated with the potential network plan.

18. The non-transitory computer-readable medium of claim 17, wherein the third user interface includes:
a graphical representation of a plurality of regions provided in the potential network plan,
wherein each region represents a set of the plurality of sites, and
a graphical representation of fourth links interconnecting the plurality of regions provided in the potential network plan.

19. The non-transitory computer-readable medium of claim 17, wherein the instructions further comprise:
one or more instructions that, when executed by the one or more processors, cause the one or more processors to:
receive, from the client device and via the first user interface, the second user interface, or the third user interface, an input indicating that the potential network plan is to be implemented in the network; and
cause, based on the input, the potential network plan to be implemented in the network by the plurality of network devices.

20. The non-transitory computer-readable medium of claim 17, wherein the instructions further comprise:
one or more instructions that, when executed by the one or more processors, cause the one or more processors to:
generate the plurality of potential network plans based on the particular time period.

* * * * *